United States Patent
Shao et al.

(10) Patent No.: US 11,469,867 B2
(45) Date of Patent: Oct. 11, 2022

(54) METHOD AND APPARATUS FOR TRANSMITTING REFERENCE SIGNAL AND METHOD AND APPARATUS FOR RECEIVING REFERENCE SIGNAL

(71) Applicant: HUAWEI TECHNOLOGIES CO., LTD., Guangdong (CN)

(72) Inventors: Jiafeng Shao, Beijing (CN); Chaojun Li, Beijing (CN); Zuomin Wu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 391 days.

(21) Appl. No.: 16/521,536

(22) Filed: Jul. 24, 2019

(65) Prior Publication Data
US 2019/0349163 A1 Nov. 14, 2019

Related U.S. Application Data

(63) Continuation of application No. PCT/CN2017/072708, filed on Jan. 15, 2017.

(51) Int. Cl.
*H04L 5/00* (2006.01)
*H04W 72/04* (2009.01)
(Continued)

(52) U.S. Cl.
CPC ....... *H04L 5/0048* (2013.01); *H04W 72/0413* (2013.01); *H04W 72/0446* (2013.01);
(Continued)

(58) Field of Classification Search
None
See application file for complete search history.

(56) References Cited

U.S. PATENT DOCUMENTS 8,351,370 B2 * 1/2013 Kim .................. H04L 5/0053
370/322
8,891,452 B2 * 11/2014 Nishio .............. H04L 5/0048
370/479
(Continued)

FOREIGN PATENT DOCUMENTS

CN 101795145 A 8/2010
CN 102083223 A 6/2011
(Continued)

OTHER PUBLICATIONS

Nokia et al: "On the DL control channel OM-RS design for NR", 3GPP Draft; R1-1701010, vol. RAN WG1, No. Spokane, WA, USA; Jan. 2017, total 4 pages XP051208525.
(Continued)

*Primary Examiner* — Gregory B Sefcheck
*Assistant Examiner* — Srinivasa R Reddivalam
(74) *Attorney, Agent, or Firm* — Womble Bond Dickinson (US) LLP

(57) ABSTRACT

Embodiments of the present invention provide a method and an apparatus for transmitting a reference signal and a method and an apparatus for receiving a reference signal. The method includes: determining, by a terminal device, sequence information of a first sequence set corresponding to a first reference signal and information about a first resource used for transmitting the first reference signal, where the first sequence set includes at least one sequence, the information about the first resource includes time domain information of the first resource and/or frequency domain information of the first resource, and a first mapping relationship exists between the sequence information of the first sequence set and the information about the first resource; and transmitting, by the terminal device, the first reference signal based on the sequence information of the first sequence set and the information about the first
(Continued)

resource. This can reduce signaling overheads during uplink transmission, improve utilization efficiency of system resources, and improve system reliability.

18 Claims, 6 Drawing Sheets

(51) Int. Cl.
   *H04W 72/12* (2009.01)
   *H04W 28/06* (2009.01)

(52) U.S. Cl.
   CPC ... *H04W 72/0453* (2013.01); *H04W 72/1268* (2013.01); *H04W 28/06* (2013.01)

(56) References Cited

U.S. PATENT DOCUMENTS

| | | | | |
|---|---|---|---|---|
| 2012/0039287 A1* | 2/2012 | Ko | ........................ | H04L 5/0053 370/329 |
| 2013/0028134 A1* | 1/2013 | Wang | .................... | H04L 5/0048 370/254 |
| 2014/0241284 A1 | 8/2014 | Zhou | | |
| 2015/0222402 A1* | 8/2015 | Ouchi | ............... | H04W 72/0446 370/329 |
| 2015/0326356 A1* | 11/2015 | Guan | .................. | H04L 27/2613 370/330 |
| 2018/0152950 A1* | 5/2018 | Xiong | ............... | H04W 72/0446 |
| 2018/0206157 A1* | 7/2018 | Zhu | ........................ | H04L 5/0032 |
| 2018/0212711 A1* | 7/2018 | Zhu | ........................ | H04L 5/0048 |
| 2019/0357184 A1* | 11/2019 | Tang | .................... | H04J 11/0086 |

FOREIGN PATENT DOCUMENTS

| | | |
|---|---|---|
| CN | 103096389 A | 5/2013 |
| CN | 103580790 A | 2/2014 |
| CN | 103973392 A | 8/2014 |
| WO | 2013023148 A1 | 2/2013 |
| WO | 2015020398 A1 | 2/2015 |
| WO | 2016204713 A1 | 12/2016 |

OTHER PUBLICATIONS

NEC Group et al: "Mapping of UL RS sequence for clustered DFT-S-OFDM", 3GPP Draft; R1-093865, Oct. 2009, total 4 pages. XP050388370.

ZTE Corporation, ZTE Microelectronics,"Beam Management for Control Channel",3GPP TSG RAN WG1 Meeting #86bis Lisbon, Portugal Oct. 10-14, 2016, R1-1609878,total 7 pages.

3GPP TS 36.211 V14.1.0 (Dec. 2016), 3rd Generation Partnership Project; Technical Specification Group Radio Access Network; Evolved Universal Terrestrial Radio Access (E-UTRA); Physical channels and modulation(Release 14), 175 pages.

3GPP TS 36.212 V14.1.1 (Jan. 2017), 3rd Generation Partnership Project; Technical Specification Group Radio Access Network; Evolved Universal Terrestrial Radio Access (E-UTRA); Multiplexing and channel coding(Release 14), 149 pages.

* cited by examiner

⊠ Frequency domain unit included in a pattern 1

⊞ Frequency domain unit included in a pattern 2

▨ Frequency domain unit included in a pattern 3

▥ Frequency domain unit included in a pattern 4

When a frequency domain resource is used in a code division multiplexing mode to transmit a reference signal, the frequency domain resource includes a pattern 1

METHOD AND APPARATUS FOR TRANSMITTING REFERENCE SIGNAL AND METHOD AND APPARATUS FOR RECEIVING REFERENCE SIGNAL

CROSS-REFERENCE TO RELATED APPLICATIONS

This application is a continuation of International Application No. PCT/CN2017/072708, filed on Jan. 25, 2017, the disclosure of which is hereby incorporated by reference in its entirety.

TECHNICAL FIELD

Embodiments of the present invention relate to the communications field, and more specifically, to a method and an apparatus for transmitting a reference signal and a method and an apparatus for receiving a reference signal.

BACKGROUND

To improve reliability and accuracy of uplink transmission, a terminal device transmits an uplink reference signal during uplink transmission.

In addition, in the prior art, during transmission of an uplink reference signal, the terminal device needs to determine a resource (for example, a time domain resource and/or a frequency domain resource) and a sequence that are to be used for the uplink reference signal.

For this, in the prior art, a network device may separately transmit, to the terminal device, information about the resource used for the uplink reference signal and information about the sequence used for the uplink reference signal. To be specific, in the prior art, the resource and the sequence of the uplink reference signal are indicated separately. As a result, signaling overheads are relatively large during transmission of the uplink reference signal (specifically, during indication of the resource and the sequence) in the prior art, causing low utilization efficiency of system resources. In addition, transmission of large signaling may increase, a possibility of occurrence of a transmission error, affecting system reliability.

Therefore, a technology is expected to reduce signaling overheads in uplink transmission and improve utilization efficiency of system resources and system reliability.

SUMMARY

A method and an apparatus for transmitting a reference signal and a method and an apparatus for receiving a reference signal are provided to reduce signaling overheads during uplink transmission, improve utilization efficiency of system resources, and improve system reliability.

According to a first aspect, a method for transmitting a reference signal is provided, where the method includes: determining, by a terminal device, sequence information of a first sequence set corresponding to a first reference signal and information about a first resource used for transmitting the first reference signal, where the first sequence set includes at least one sequence, the information about the first resource includes time domain information and/or frequency domain information, and a first mapping relationship exists between the sequence information of the first sequence set and the information about the first resource; and transmitting, by the terminal device, the first reference signal based on the sequence information of the first sequence set and the information about the first resource.

In one embodiment, the first mapping relationship includes: a mapping relationship between the sequence information of the first sequence set and the time domain information of the first resource; or a mapping relationship between the sequence information of the first sequence set and the frequency domain information of the first resource; or a mapping relationship between the sequence information of the first sequence set and the frequency domain information and the time domain information of the first resource.

According to one embodiment of the present invention, because a mapping relationship exists between the information about the first resource (including a time domain resource and/or a frequency domain resource) used for transmitting the first reference signal and the information of the sequence set (including at least one sequence) corresponding to the first reference signal, the first resource can be determined when the information of the sequence set corresponding to the first reference signal is determined. This can reduce signaling overheads for transmitting the first resource and information about the sequence set corresponding to the first reference signal, and can further reduce signaling overheads during uplink transmission, improve utilization efficiency of system resources, and improve system reliability.

In one embodiment, the determining, by a terminal device, sequence information of a first sequence set corresponding to a first reference signal and information about a first resource used for transmitting the first reference signal includes: receiving, by the terminal device, first indication information, where the first indication information is used to indicate the sequence information of the first sequence set; and determining, by the terminal device, the information about the first resource based on the sequence information of the first sequence set and the first mapping relationship.

In one embodiment, the information about the first resource includes the time domain information, and the first mapping relationship is specifically a mapping relationship between the sequence information of the first sequence set and the time domain information of the first resource; and the determining, by a terminal device, sequence information of a first sequence set corresponding to a first reference signal and information about a first resource used for transmitting the first reference signal includes: receiving, by the terminal device, first indication information, where the first indication information is used to indicate the sequence information of the first sequence set; determining, by the terminal device, the sequence information of the first sequence set based on the first indication information; and determining, by the terminal device, the time domain information of the first resource based on the sequence information of the first sequence set and the first mapping relationship.

In one embodiment, the determining, by the terminal device, the time domain information of the first resource based on the sequence information of the first sequence set and the first mapping relationship includes: determining, by the terminal device, an index of a first time unit and a location of the first symbol in the first time unit based on the sequence information of the first sequence set and the first mapping relationship, where the first time unit is a time unit carrying the first reference signal.

In one embodiment, the determining, by the terminal device, the time domain information of the first resource based on the sequence information of the first sequence set and the first mapping relationship includes: determining, by the terminal device, a time unit offset between a first time unit and a second time unit and a location of the first symbol in the first time unit based on the sequence information of the first sequence set and the first mapping relationship, where the first time unit is a time unit carrying the first reference signal.

In one embodiment, the information about the first resource includes the frequency domain information, and the first mapping relationship is specifically a mapping relationship between the sequence information of the first sequence set and the frequency domain information of the first resource; and the determining, by a terminal device, sequence information of a first sequence set corresponding to a first reference signal and information about a first resource used for transmitting the first reference signal includes: receiving, by the terminal device, first indication information, where the first indication information is used to indicate the sequence information of the first sequence set; determining, by the terminal device, the sequence information of the first sequence set based on the first indication information; and determining, by the terminal device, the frequency domain information of the first resource based on the sequence information of the first sequence set and the first mapping relationship.

In one embodiment, the frequency domain information includes first frequency domain information, and the first frequency domain information is a frequency domain pattern of a frequency division multiplexing mode.

In one embodiment, the first frequency domain information is used to indicate at least a first frequency domain pattern and a second frequency domain pattern, the first frequency domain pattern is different from the second frequency domain pattern, the sequence information of the first sequence set includes at least a first sequence and a second sequence, and the first sequence is different from the second sequence; and the first sequence corresponds to the first frequency domain pattern, and the second sequence corresponds to the second frequency domain pattern.

In one embodiment, the first reference signal includes at least two layers of sub reference signals, the first sequence is a sequence used by a first sub reference signal at the at least two layers of sub reference signals, the second sequence is a sequence used by a second sub reference signal at the at least two layers of sub reference signals, the first frequency domain pattern is a frequency domain pattern used by the first sub reference signal, and the second frequency domain pattern is a frequency domain pattern used by the second sub reference signal.

In one embodiment, the first mapping relationship is specifically that the information about the first resource (time domain information and/or frequency domain information) is determined based on a function that uses the sequence information of the first sequence set as a variable.

According to one embodiment of the present invention, because a mapping relationship exists between the information about the first resource used for carrying or transmitting the first reference signal and the information of the first sequence set used for the first reference signal, the terminal device can determine the information about the first resource based on the information of the first sequence set and the mapping relationship. Therefore, there is no need to transmit signaling used to indicate the information about the first resource. This can reduce signaling overheads for transmitting the first resource and information about the sequence set corresponding to the first reference signal, and can further reduce signaling overheads during uplink transmission, improve utilization efficiency of system resources, and improve system reliability.

Further, according to one embodiment of the present invention, because different sequences correspond to frequency domain patterns of different frequency division multiplexing modes, or different layers of sub reference signals use frequency domain patterns of different frequency division multiplexing modes, orthogonality of different sub reference signals can be improved. To be specific, an inter-layer isolation degree is increased, and therefore, reception performance of the reference signal is improved.

In one embodiment, the information about the first resource includes the time domain information, and the first mapping relationship includes a mapping relationship between the sequence information of the first sequence set and the time domain information of the first resource; and the determining, by a terminal device, sequence information of a first sequence set corresponding to a first reference signal and information about a first resource used for transmitting the first reference signal includes: receiving, by the terminal device, second indication information, where the second indication information is used to indicate the time domain information of the first resource; and determining, by the terminal device, the sequence information of the first sequence set based on the time domain information of the first resource and the first mapping relationship.

In one embodiment, the first mapping relationship is specifically that the sequence information of the first sequence set is determined based on a function that uses the time domain information of the first resource as a variable.

In one embodiment, the sequence information includes cyclic shift information or variable information used for obtaining a cyclic shift.

In one embodiment, the determining, by the terminal device, the sequence information of the first sequence set based on the time domain information of the first resource and the first mapping relationship includes: determining, by the terminal device, cyclic shift information of the first sequence set according to the following formula: $n_{cs,\lambda} = (n_{DMRS}^{(1)} + n_{DMRS,\lambda}^{(2)} + n_{PN}(n_{TU})) \bmod y$, where $n_{cs,\lambda}$ indicates cyclic shift information of a sequence of $\lambda^{th}$-layer sub reference signal carried in a time unit (or a time unit carrying the first reference signal) corresponding to the first resource, $\lambda$ indicates a layer number of the sub reference signal using the cyclic shift, $\lambda$ is an integer greater than or equal to 0, $n_{DMRS}^{(1)}$ indicates first intermediate variable information for the cyclic shift information, $n_{DMRS}^{(1)}$ may be configured based on higher layer signaling cyclicShift (cyclicShift) received by the terminal device, $n_{DMRS,\lambda}^{(2)}$ indicates second intermediate variable information for the cyclic shift information of the sequence of the $\lambda^{th}$-layer sub reference signal, $n_{PN}(n_s)$ indicates third intermediate variable information for the cyclic shift information, and $n_{PN}(n_{TU})$ may be a function that uses an index (that is, $n_{TU}$) of a time unit as a variable, where $n_{TU}$ may be an index of a time unit of an uplink channel demodulated based on the first reference signal, or $n_{TU}$ may be an index of the time unit of the first reference signal. As an example rather than a limitation, $n_{PN}(n_s)$ may be, for example, $n_{PN}(n_{TU}) = \sum_{i=0}^{7} c(8N_{symb}^{UL} \cdot n_{TU} + i) \cdot 2^i$, where $c(i)$ is a random sequence, $N_{symb}^{UL}$ is a quantity of uplink symbols in a time unit, the index of the time unit may be an index of a time unit used for transmitting a reference signal in a radio frame (or a subframe or a slot) or an index of a time unit used for transmitting information, and $n_{DMRS,\lambda}^{(2)} = (n_{DMRS,\lambda\text{-}baseline}^{(2)} + n_{TO}) \bmod y$, where $n_{DMRS,\lambda\text{-}baseline}^{(2)}$ is reference information used for determining the second intermediate variable information, and y is a preset value. For example, a value of y may be 6 or 12. $n_{TO}$ indicates an offset between the time unit of the first reference signal and a time unit of a first uplink channel (uplink channel demodulated based on the first reference signal). $n_{DMRS,\lambda\text{-}baseline}^{(2)}$ may be determined by the terminal device based on an indication in recently received physical layer indication information or configured based on higher layer signaling. $n_{DMRS,\lambda\text{-}baseline}^{(2)}$ is a relative position predefined for a time unit, where the predefined relative position of the time unit is a position of the time unit used for transmitting the first reference signal, relative to the time unit used for transmitting the first uplink channel. For example, the predefined relative position of the time unit is that the time unit used for transmitting the first reference signal and the time unit used for transmitting the first uplink channel are the same; or the predefined relative position of the time unit is that the time unit used for transmitting the first reference signal and the time unit used for transmitting the first uplink channel are the same and that the first reference signal is on the first symbol or the last symbol of the time unit. The predefined relative position of the time unit may be preset or may be configured by using higher layer signaling. For example, if the predefined relative position of the time unit is that the time unit used for transmitting the first reference signal and the time unit used for transmitting the first uplink channel are the same, a time unit offset is 0. If a current relative position of the time unit is that the time unit used for transmitting the first reference signal is a time unit before the time unit used for transmitting the first uplink channel, a time unit offset is 1 or −1. The time unit offset is a time unit offset between the predefined relative position of the time unit and the current relative position of the time unit, and a sub reference signal at each layer corresponds to a same time unit offset.

In one embodiment, the determining, by the terminal device, the sequence information of the first sequence set based on the time domain information of the first resource and the first mapping relationship includes: determining, by the terminal device, cyclic shift information of the first sequence set according to the following formula: $n_{DMRS,\lambda}^{(2)} = n_{DMRS,\lambda}^{'(2)}(n_{TU} \bmod x)$, where $n_{DMRS,\lambda}^{(2)}$ indicates second intermediate variable information used for determining cyclic shift information of a sequence of $\lambda^{th}$-layer sub reference signal, $n_{DMRS,\lambda}^{'(2)}(\ )$ indicates second intermediate variable information for cyclic shift information of the sequence of the $\lambda^{th}$-layer sub reference signal corresponding to a time unit index $n_{TU}$, $n_{DMRS,\lambda}^{'(2)}(\ )$ may be preset or configured by using higher layer signaling, the time unit index $n_{TU}$ may be an index of the time unit used for transmitting the first reference signal in a radio frame or a subframe or a slot, or the time unit index $n_{TU}$ may be an index of the time unit used for transmitting the first uplink channel in a radio frame or a subframe or a slot, x is a positive integer greater than 0, and x may be preset or configured by using higher layer signaling. For example, x is any value in 2, 3, 4, 6, and 12.

According to one embodiment of the present invention, because a mapping relationship exists between the time domain information of the first resource used for transmitting the first reference signal and the information of the first sequence set used for the first reference signal, the terminal device can determine the information of the first sequence set based on the time domain information of the first resource and the mapping relationship. Therefore, there is no need to transmit signaling used to indicate the information of the first sequence set. This can reduce signaling overheads for transmitting the first resource and information about the sequence set corresponding to the first reference signal, and can further reduce signaling overheads during uplink transmission, improve utilization efficiency of system resources, and improve system reliability.

In one embodiment, the first mapping relationship is specifically that the sequence information of the first sequence set and the time domain information and/or frequency domain information of the first resource belong to a same parameter set in N parameter sets, where N≥2, each of the N parameter sets includes at least one piece of sequence information, each parameter set includes at least one piece of time domain information and/or at least one piece of frequency domain information, and at least one of time domain information, frequency domain information, and sequence information in any two parameter sets is different.

That sequence information included in two parameter sets is different may include: orders of sequences indicated by the sequence information included in the two parameter sets are different. For example, if sequence information in a parameter set #X is different from sequence information in a parameter set #Y, a sequence indicated by the sequence information included in the parameter set #X may be 0, 6, 3, 9, and a sequence indicated by the sequence information included in the parameter set #Y may be 3, 9, 0, 6.

Alternatively, that sequence information included in two parameter sets is different may include: sequences indicated by the sequence information included in the two parameter sets are different. For example, if sequence information in a parameter set #X is different from sequence information in a parameter set #Y, a sequence indicated by the sequence information included in the parameter set #X may be 0, 6, 3, 9, and a sequence indicated by the sequence information included in the parameter set #Y may be 2, 5, 8, 10.

In addition, that frequency domain information included in two parameter sets is different may include: orders of frequency domain resources indicated by the frequency domain information included in the two parameter sets are different. For example, if frequency domain information in a parameter set #X is different from frequency domain information in a parameter set #Y, frequency domain resources indicated by the frequency domain information included in the parameter set #X may be sequentially a subcarrier whose subcarrier index value is odd, a subcarrier whose subcarrier index value is odd, a subcarrier whose subcarrier index value is even, and a subcarrier whose subcarrier index value is even; and frequency domain resources indicated by the frequency domain information included in the parameter set #Y may be sequentially a subcarrier whose subcarrier index value is even, a subcarrier whose subcarrier index value is even, a subcarrier whose subcarrier index value is odd, and a subcarrier whose subcarrier index value is odd.

Alternatively, that frequency domain information included in two parameter sets is different may include: frequency domain resources indicated by the frequency domain information included in the two parameter sets are different. For example, if frequency domain information in a parameter set #X is different from frequency domain information in a parameter set #Y, frequency domain resources indicated by the frequency domain information included in the parameter set #X may be sequentially a subcarrier whose subcarrier index value is odd, a subcarrier whose subcarrier index value is odd, a subcarrier whose subcarrier index value is odd, and a subcarrier whose subcarrier index value is odd; and frequency domain resources indicated by the frequency domain information included in the parameter set #Y may be sequentially a subcarrier whose subcarrier index value is even, a subcarrier whose subcarrier index value is even, a subcarrier whose subcarrier index value is even, and a subcarrier whose subcarrier index is even.

In one embodiment, the determining, by a terminal device, sequence information of a first sequence set corresponding to a first reference signal and information about a first resource used for transmitting the first reference signal includes: receiving, by the terminal device, third indication information, where the third indication information is used to indicate an identifier of a first parameter set in N parameter sets, N≥2, N is a positive integer, each of the N parameter sets includes at least one piece of sequence information, each parameter set includes a piece of time domain information and/or at least one piece of frequency domain information, and at least one of time domain information, frequency domain information, and sequence information in any two parameter sets is different; and using, by the terminal device, the information about the first resource and the sequence information that are included in the first parameter set as the information about the first resource and the sequence information of the first sequence set.

In one embodiment, the first mapping relationship is specifically that the sequence information of the first sequence set and the time domain information of the first resource belong to a same parameter set in N parameter sets, where N≥2, each of the N parameter sets includes at least one piece of sequence information, each parameter set includes at least one piece of time domain information, and at least one of time domain information and sequence information in any two parameter sets is different.

In one embodiment, the information about the first resource includes the time domain information, and the first mapping relationship is specifically a mapping relationship between the sequence information of the first sequence set and the time domain information of the first resource; and the determining, by a terminal device, sequence information of a first sequence set corresponding to a first reference signal and information about a first resource used for transmitting the first reference signal includes: receiving, by the terminal device, third indication information, where the third indication information is used to indicate an identifier of a first parameter set in N parameter sets, N≥2, N is a positive integer, each of the N parameter sets includes at least one piece of sequence information, each parameter set includes a piece of time domain information, and at least one of time domain information and sequence information in any two parameter sets is different; and using, by the terminal device, information included in the first parameter set as the time domain information of the first resource and the sequence information of the first sequence set.

In one embodiment, the first mapping relationship is specifically that the sequence information of the first sequence set and the frequency domain information of the first resource belong to a same parameter set in N parameter sets, where N≥2, each of the N parameter sets includes at least one piece of sequence information, each parameter set includes at least one piece of frequency domain information, and at least one of frequency domain information and sequence information in any two parameter sets is different.

In one embodiment, the information about the first resource includes the frequency domain information, and the first mapping relationship is specifically a mapping relationship between the sequence information of the first sequence set and the frequency domain information of the first resource; and the determining, by a terminal device, sequence information of a first sequence set corresponding to a first reference signal and information about a first resource used for transmitting the first reference signal includes: receiving, by the terminal device, third indication information, where the third indication information is used to indicate an identifier of a first parameter set in N parameter sets, N≥2, N is a positive integer, each of the N parameter sets includes at least one piece of sequence information, each parameter set includes at least one piece of frequency domain information, and at least one of frequency domain information and sequence information in any two parameter sets is different; and using, by the terminal device, information included in the first parameter set as the frequency domain information of the first resource and the sequence information of the first sequence set.

According to one embodiment of the present invention, because a mapping relationship exists between the time domain information and/or frequency domain information of the first resource used for transmitting the first reference signal and the sequence information of the first sequence set corresponding to the first reference signal, and the mapping relationship is that the time domain information and/or frequency domain information of the first resource and the sequence information of the first sequence set belong to a same parameter set (that is, the first parameter set), the terminal device can determine, in a single attempt based on an index of the first parameter set, the time domain information and/or frequency domain information of the first resource and the sequence information of the first sequence set corresponding to the first reference signal. Therefore, there is no need to separately transmit signaling used to indicate the time domain information and/or frequency domain information and the sequence information of the first sequence set corresponding to the first reference signal. This can reduce signaling overheads for transmitting the first resource and information about the sequence set corresponding to the first reference signal, and can further reduce signaling overheads during uplink transmission, improve utilization efficiency of system resources, and improve system reliability.

In one embodiment, the frequency domain information includes the first frequency domain information and second frequency domain information, where the first frequency domain information is used to indicate a frequency domain pattern corresponding to the frequency division multiplexing mode, and the second frequency domain information is a frequency domain pattern corresponding to a code division multiplexing mode.

In one embodiment, before the determining, by a terminal device, sequence information of a first sequence set corresponding to a first reference signal and information about a first resource used for transmitting the first reference signal, the method further includes: receiving, by the terminal device, fourth indication information, where the fourth indication information is used to indicate whether the frequency domain information of the first resource is the first frequency domain information or the second frequency domain information.

Therefore, based on a plurality of resource multiplexing modes supported by the method for transmitting a reference signal in this embodiment of the present invention, practicability of this embodiment of the present invention can be further improved.

In one embodiment, the time domain information is used to indicate a time unit offset between the time unit used for transmitting the first reference signal and the time unit used for transmitting the first uplink channel, and the reference signal corresponding to the first uplink channel is the first reference signal.

In one embodiment, the time domain information is used to indicate an index value of the time unit (or a time unit corresponding to the first resource) used for transmitting the first reference signal.

In one embodiment, the time domain information is used to indicate a time domain location of the first resource (or a time unit corresponding to the first resource).

In one embodiment, the time domain information is used to indicate an index value of a time unit corresponding to the first resource.

In one embodiment, the time domain information is used to indicate an index value of a time interval corresponding to the first resource.

In one embodiment, the time domain information is used to indicate an index value of a symbol corresponding to the first resource.

In one embodiment, the time domain information is used to indicate an index value of a slot corresponding to the first resource.

In one embodiment, the time domain information is used to indicate an index value of a mini-slot corresponding to the first resource.

In one embodiment, the time domain information is used to indicate an index value of a subframe corresponding to the first resource.

In one embodiment, the time domain information is specifically used to indicate a time domain location of a time unit used for transmitting a reference signal in a radio frame or a subframe or a slot or a mini-slot.

In one embodiment, the time domain information is specifically used to indicate a time domain location of a symbol used for transmitting a reference signal in a time unit used for transmission.

In one embodiment, a value of a cyclic shift of each sequence in the first sequence set is a value obtained by rounding up after a value of a cyclic shift of each sequence in a second sequence set is divided by 2, or a value of a cyclic shift of each sequence in the sequence information of the first sequence set is a value obtained by rounding down after a value of a cyclic shift of each sequence in a second sequence set is divided by 2, where a value range of the cyclic shift of the sequence in the second sequence set is 0 to 11.

In one embodiment, a value range of a cyclic shift of the first sequence set is 0 to 5.

In one embodiment, the determining, by a terminal device, sequence information of a first sequence set corresponding to a first reference signal and information about a first resource used for transmitting the first reference signal includes: receiving, by the terminal device, K pieces of control information, where each of the K pieces of control information is used to instruct the terminal device to transmit the first reference signal on the first resource, and K≥2; and determining, by the terminal device, the information about the first resource based on first control information in the K pieces of control information, where the first control information is a first piece of control information, received by the terminal device, in the K pieces of control information.

In one embodiment, when the first time unit carrying the first reference signal includes three symbols, and the first time unit is the first time unit in a time period, the first reference signal is carried in the second symbol of the first time unit, or the first reference signal is carried in the last symbol of the first time unit.

In one embodiment, when the first time unit carrying the first reference signal includes three symbols, and the first time unit is the last time unit in a time period, the first reference signal is carried in the first symbol of the first time unit, or the first reference signal is carried in the second symbol of the first time unit.

In one embodiment, when the first time unit carrying the first reference signal includes three symbols, and the first time unit is the third time unit in a time period, the first reference signal is carried in the first symbol of the first time unit, or the first reference signal is carried in the second symbol of the first time unit.

In one embodiment, a time period includes six time units.

In one embodiment, the first time unit in a time period includes three symbols, the last time unit in the time period includes three symbols, and each time unit except the first time unit and the last time unit in the time period includes two symbols.

In one embodiment, the third time unit in a time period includes three symbols, the last time unit in the time period includes three symbols, and each time unit except the third time unit and the last time unit in the time period includes two symbols.

In one embodiment, a time period is a subframe, or a time period is one millisecond (ms).

According to a second aspect, a method for receiving a reference signal is provided, where the method includes: determining, by a network device, sequence information of a first sequence set corresponding to a first reference signal and information about a first resource used for transmitting the first reference signal, where the first sequence set includes at least one sequence, the information about the first resource includes time domain information and/or frequency domain information, and a first mapping relationship exists between the sequence information of the first sequence set and the information about the first resource; and receiving, by the network device, the first reference signal based on the sequence information of the first sequence set and the information about the first resource.

In one embodiment, the first mapping relationship includes: a mapping relationship between the sequence information of the first sequence set and the time domain information of the first resource; or a mapping relationship between the sequence information of the first sequence set and the frequency domain information of the first resource; or a mapping relationship between the sequence information of the first sequence set and the frequency domain information and the time domain information of the first resource.

According to one embodiment of the present invention, because a mapping relationship exists between the information about the first resource (including a time domain resource and/or a frequency domain resource) used for transmitting the first reference signal and the information of the sequence set (including at least one sequence) corresponding to the first reference signal, the first resource can be determined when the information of the sequence set corresponding to the first reference signal is determined. This can reduce signaling overheads for transmitting the first resource and information about the sequence set corresponding to the first reference signal, and can further reduce signaling overheads during uplink transmission, improve utilization efficiency of system resources, and improve system reliability.

In one embodiment, the determining, by a network device, sequence information of a first sequence set corresponding to a first reference signal and information about a first resource used for transmitting the first reference signal includes: determining, by the terminal device, the information about the first resource based on the sequence information of the first sequence set and the first mapping relationship; and the method further includes: transmitting, by the network device, first indication information to a terminal device, where the first indication information is used to indicate the sequence information of the first sequence set.

In one embodiment, the information about the first resource includes the time domain information, and the first mapping relationship is specifically a mapping relationship between the sequence information of the first sequence set and the time domain information of the first resource; the determining, by a network device, sequence information of a first sequence set corresponding to a first reference signal and information about a first resource used for transmitting the first reference signal includes: determining, by the terminal device, the time domain information of the first resource based on the sequence information of the first sequence set and the first mapping relationship; and the method further includes: transmitting, by the network device, first indication information to a terminal device, where the first indication information is used to indicate the sequence information of the first sequence set.

In one embodiment, the determining, by the network device, the time domain information of the first resource based on the sequence information of the first sequence set and the first mapping relationship includes: determining, by the network device, an index of a first time unit and a location of the first symbol in the first time unit based on the sequence information of the first sequence set and the first mapping relationship, where the first time unit is a time unit carrying the first reference signal.

In one embodiment, the determining, by the network device, the time domain information of the first resource based on the sequence information of the first sequence set and the first mapping relationship includes: determining, by the network device, a time unit offset between a first time unit and a second time unit and a location of the first symbol in the first time unit based on the sequence information of the first sequence set and the first mapping relationship, where the first time unit is a time unit carrying the first reference signal.

In one embodiment, the information about the first resource includes the frequency domain information, the first mapping relationship is specifically a mapping relationship between the sequence information of the first sequence set and the frequency domain information of the first resource, and the first mapping relationship is specifically a mapping relationship between the sequence information of the first sequence set and the time domain information of the first resource; the determining, by a network device, sequence information of a first sequence set corresponding to a first reference signal and information about a first resource used for transmitting the first reference signal includes: determining, by the terminal device, the frequency domain information of the first resource based on the sequence information of the first sequence set and the first mapping relationship; and the method further includes: transmitting, by the network device, first indication information, where the first indication information is used to indicate the sequence information of the first sequence set.

In one embodiment, the frequency domain information includes first frequency domain information, and the first frequency domain information is a frequency domain pattern of a frequency division multiplexing mode.

In one embodiment, the first frequency domain information is used to indicate at least a first frequency domain pattern and a second frequency domain pattern, the first frequency domain pattern is different from the second frequency domain pattern, the sequence information of the first sequence set includes at least a first sequence and a second sequence, and the first sequence is different from the second sequence; and the first sequence corresponds to the first frequency domain pattern, and the second sequence corresponds to the second frequency domain pattern.

In one embodiment, the first reference signal includes at least two layers of sub reference signals, the first sequence is a sequence used by a first sub reference signal at the at least two layers of sub reference signals, the second sequence is a sequence used by a second sub reference signal at the at least two layers of sub reference signals, the first frequency domain pattern is a frequency domain pattern used by the first sub reference signal, and the second frequency domain pattern is a frequency domain pattern used by the second sub reference signal.

Optionally, the first mapping relationship is specifically that the information about the first resource (time domain information and/or frequency domain information) is determined based on a function that uses the sequence information of the first sequence set as a variable.

According to one embodiment of the present invention, because a mapping relationship exists between the information about the first resource used for carrying or transmitting the first reference signal and the information of the first sequence set used for the first reference signal, the terminal device can determine the information about the first resource based on the information of the first sequence set and the mapping relationship. Therefore, there is no need to transmit signaling used to indicate the information about the first resource. This can reduce signaling overheads for transmitting the first resource and information about the sequence set corresponding to the first reference signal, and can further reduce signaling overheads during uplink transmission, improve utilization efficiency of system resources, and improve system reliability.

Further, according to one embodiment of the present invention, because different sequences correspond to frequency domain patterns of different frequency division multiplexing modes, or different layers of sub reference signals use frequency domain patterns of different frequency division multiplexing modes, orthogonality of different sub reference signals can be improved. To be specific, an inter-layer isolation degree is increased, and therefore, reception performance of the reference signal is improved.

In one embodiment, the information about the first resource includes the time domain information, and the first mapping relationship includes a mapping relationship between the sequence information of the first sequence set and the time domain information of the first resource; the determining, by a network device, sequence information of a first sequence set corresponding to a first reference signal and information about a first resource used for transmitting the first reference signal includes: determining, by the terminal device, the sequence information of the first sequence set based on the time domain information of the first resource and the first mapping relationship; and the method further includes: transmitting, by the network device, second indication information to a terminal device, where the second indication information is used to indicate the time domain information of the first resource.

In one embodiment, the first mapping relationship is specifically that the sequence information of the first sequence set is determined based on a function that uses the time domain information of the first resource as a variable.

In one embodiment, the sequence information includes cyclic shift information or variable information used for obtaining a cyclic shift.

In one embodiment, the determining, by the network device, the sequence information of the first sequence set based on the time domain information of the first resource and the first mapping relationship includes: determining, by the network device, cyclic shift information of the first sequence set according to the following formula: $n_{cs,\lambda} = (n_{DMRS}^{(1)} + n_{DMRS,\lambda}^{(2)} + n_{PN}(n_{TU}))\bmod y$, where $n_{cs,\lambda}$ indicates cyclic shift information of a sequence of $\lambda^{th}$-layer sub reference signal carried in a time unit (or a time unit carrying the first reference signal) corresponding to the first resource, $\lambda$ indicates a layer number of the sub reference signal using the cyclic shift, $\lambda$ is an integer greater than or equal to 0, $n_{DMRS}^{(1)}$ indicates first intermediate variable information for the cyclic shift information, $n_{DMRS}^{(1)}$ may be configured based on higher layer signaling cyclicShift (cyclicShift) received by the terminal device, $n_{DMRS,\lambda}^{(2)}$ indicates second intermediate variable information for the cyclic shift information of the sequence of the $\lambda^{th}$-layer sub reference signal, $n_{PN}(n_s)$ indicates third intermediate variable information for the cyclic shift information, and $n_{PN}(n_{TU})$ may be a function that uses an index (that is, $n_{TU}$) of a time unit as a variable, where $n_{TU}$ may be an index of a time unit of an uplink channel demodulated based on the first reference signal, or $n_{TU}$ may be an index of the time unit of the first reference signal. As an example rather than a limitation, $n_{PN}(n_s)$ may be, for example, $n_{PN}(n_{TU}) = \Sigma_{i=0}^{7} c(8N_{symb}^{UL} \cdot n_{TU} + i) \cdot 2^i$, where $c(i)$ is a random sequence, $N_{symb}^{UL}$ is a quantity of uplink symbols in a time unit, the index of the time unit may be an index of a time unit used for transmitting a reference signal in a radio frame (or a subframe or a slot) or an index of a time unit used for transmitting information, and $n_{DMRS,\lambda}^{(2)} = (n_{DMRS,\lambda\text{-baseline}}^{(2)} + n_{TO}) \bmod y$, where $n_{DMRS,\lambda\text{-baseline}}^{(2)}$ is reference information used for determining the second intermediate variable information, and y is a preset value. For example, a value of y may be 6 or 12. $n_{TO}$ indicates an offset between the time unit of the first reference signal and a time unit of a first uplink channel (uplink channel demodulated based on the first baseline reference signal). $n_{DMRS,\lambda\text{-baseline}}^{(2)}$ may be determined by the terminal device based on an indication in recently received physical layer indication information or configured based on higher layer signaling. $n_{DMRS,\lambda\text{-baseline}}^{(2)}$ is a relative position predefined for a time unit, where the predefined relative position of the time unit is a position of the time unit used for transmitting the first reference signal, relative to the time unit used for transmitting the first uplink channel. For example, the predefined relative position of the time unit is that the time unit used for transmitting the first reference signal and the time unit used for transmitting the first uplink channel are the same; or the predefined relative position of the time unit is that the time unit used for transmitting the first reference signal and the time unit used for transmitting the first uplink channel are the same and that the first reference signal is on the first symbol or the last symbol of the time unit. The predefined relative position of the time unit may be preset or may be configured by using higher layer signaling. For example, if the predefined relative position of the time unit is that the time unit used for transmitting the first reference signal and the time unit used for transmitting the first uplink channel are the same, a time unit offset is 0. If a current relative position of the time unit is that the time unit used for transmitting the first reference signal is a time unit before the time unit used for transmitting the first uplink channel, a time unit offset is 1 or −1. The time unit offset is a time unit offset between the predefined relative position of the time unit and the current relative position of the time unit, and a sub reference signal at each layer corresponds to a same time unit offset.

In one embodiment, the determining, by the network device, the sequence information of the first sequence set based on the time domain information of the first resource and the first mapping relationship includes: determining, by the network device, cyclic shift information of the first sequence set according to the following formula: $n_{DMRS,\lambda}^{(2)} = n_{DMRS,\lambda}^{'(2)} (n_{TU} \bmod x)$, where $n_{DMRS,\lambda}^{(2)}$ indicates second intermediate variable information used for determining cyclic shift information of a sequence of $\lambda^{th}$-layer sub reference signal, $n_{DMRS,\lambda}^{'(2)}(\ )$ indicates second intermediate variable information for cyclic shift information of the sequence of the $\lambda^{th}$-layer sub reference signal corresponding to a time unit index $n_{TU}$, $n_{DMRS,\lambda}^{'(2)}(\ )$ may be preset or configured by using higher layer signaling, the time unit index $n_{TU}$ may be an index of the time unit used for transmitting the first reference signal in a radio frame or a subframe or a slot, or the time unit index $n_{TU}$ may be an index of the time unit used for transmitting the first uplink channel in a radio frame or a subframe or a slot, x is a positive integer greater than 0, and x may be preset or configured by using higher layer signaling. For example, x is any value in 2, 3, 4, 6, and 12.

According to one embodiment of the present invention, because a mapping relationship exists between the time domain information of the first resource used for transmitting the first reference signal and the information of the first sequence set used for the first reference signal, the terminal device can determine the information of the first sequence set based on the time domain information of the first resource and the mapping relationship. Therefore, there is no need to transmit signaling used to indicate the information of the first sequence set. This can reduce signaling overheads for transmitting the first resource and information about the sequence set corresponding to the first reference signal, and can further reduce signaling overheads during uplink transmission, improve utilization efficiency of system resources, and improve system reliability.

In one embodiment, the first mapping relationship is specifically that the sequence information of the first sequence set and the time domain information and/or frequency domain information of the first resource belong to a same parameter set in N parameter sets, where N≥2, each of the N parameter sets includes at least one piece of sequence information, each parameter set includes at least one piece of time domain information and/or at least one piece of frequency domain information, and at least one of time domain information, frequency domain information, and sequence information in any two parameter sets is different.

That sequence information included in two parameter sets is different may include: orders of sequences indicated by the sequence information included in the two parameter sets are different. For example, if sequence information in a parameter set #X is different from sequence information in a parameter set #Y, a sequence indicated by the sequence information included in the parameter set #X may be 0, 6, 3, 9, and a sequence indicated by the sequence information included in the parameter set #Y may be 3, 9, 0, 6.

Alternatively, that sequence information included in two parameter sets is different may include: sequences indicated by the sequence information included in the two parameter sets are different. For example, if sequence information in a parameter set #X is different from sequence information in a parameter set #Y, a sequence indicated by the sequence information included in the parameter set #X may be 0, 6, 3, 9, and a sequence indicated by the sequence information included in the parameter set #Y may be 2, 5, 8, 10.

In addition, that frequency domain information included in two parameter sets is different may include: orders of frequency domain resources indicated by the frequency domain information included in the two parameter sets are different. For example, if frequency domain information in a parameter set #X is different from frequency domain information in a parameter set #Y, frequency domain resources indicated by the frequency domain information included in the parameter set #X may be sequentially a subcarrier whose subcarrier index value is odd, a subcarrier whose subcarrier index value is odd, a subcarrier whose subcarrier index value is even, and a subcarrier whose subcarrier index value is even; and frequency domain resources indicated by the frequency domain information included in the parameter set #Y may be sequentially a subcarrier whose subcarrier index value is even, a subcarrier whose subcarrier index value is even, a subcarrier whose subcarrier index value is odd, and a subcarrier whose subcarrier index value is odd.

Alternatively, that frequency domain information included in two parameter sets is different may include: frequency domain resources indicated by the frequency domain information included in the two parameter sets are different. For example, if frequency domain information in a parameter set #X is different from frequency domain information in a parameter set #Y, frequency domain resources indicated by the frequency domain information included in the parameter set #X may be sequentially a subcarrier whose subcarrier index value is odd, a subcarrier whose subcarrier index value is odd, a subcarrier whose subcarrier index value is odd, and a subcarrier whose subcarrier index value is odd; and frequency domain resources indicated by the frequency domain information included in the parameter set #Y may be sequentially a subcarrier whose subcarrier index value is even, a subcarrier whose subcarrier index value is even, a subcarrier whose subcarrier index value is even, and a subcarrier whose subcarrier index is even.

In one embodiment, the determining, by a network device, sequence information of a first sequence set corresponding to a first reference signal and information about a first resource used for transmitting the first reference signal includes: determining, by the network device, a first parameter set from N parameter sets, where information included in the first parameter set is the information about the first resource and the sequence information of the first sequence set, N≥2, N is a positive integer, each of the N parameter sets includes at least one piece of sequence information, each parameter set includes at least one piece of time domain information and/or at least one piece of frequency domain information, and at least one of time domain information, frequency domain information, and sequence information in any two parameter sets is different; and the method further includes: transmitting, by the network device, third indication information to a terminal device, where the third indication information is used to indicate an identifier of the first parameter set.

In one embodiment, the first mapping relationship is specifically that the sequence information of the first sequence set and the time domain information of the first resource belong to a same parameter set in N parameter sets, where N≥2, each of the N parameter sets includes at least one piece of sequence information, each parameter set includes at least one piece of time domain information, and at least one of time domain information and sequence information in any two parameter sets is different.

In one embodiment, the first mapping relationship is specifically that the sequence information of the first sequence set and the frequency domain information of the first resource belong to a same parameter set in N parameter sets, where N≥2, each of the N parameter sets includes at least one piece of sequence information, each parameter set includes at least one piece of frequency domain information, and at least one of frequency domain information and sequence information in any two parameter sets is different.

According to one embodiment of the present invention, because a mapping relationship exists between the time domain information and/or frequency domain information of the first resource used for transmitting the first reference signal and the sequence information of the first sequence set corresponding to the first reference signal, and the mapping relationship is that the time domain information and/or frequency domain information of the first resource and the sequence information of the first sequence set belong to a same parameter set (that is, the first parameter set), the terminal device can determine, in a single attempt based on an index of the first parameter set, the time domain information and/or frequency domain information of the first resource and the sequence information of the first sequence set corresponding to the first reference signal. Therefore, there is no need to separately transmit signaling used to indicate the time domain information and/or frequency domain information and the sequence information of the first sequence set corresponding to the first reference signal. This can reduce signaling overheads for transmitting the first resource and information about the sequence set corresponding to the first reference signal, and can further reduce signaling overheads during uplink transmission, improve utilization efficiency of system resources, and improve system reliability.

In one embodiment, the frequency domain information includes the first frequency domain information and second frequency domain information, where the first frequency domain information is used to indicate a frequency domain pattern corresponding to the frequency division multiplexing mode, and the second frequency domain information is a frequency domain pattern corresponding to a code division multiplexing mode.

In one embodiment, the method further includes: transmitting, by the network device, fourth indication information to the terminal device, where the fourth indication information is used to indicate whether the frequency domain information of the first resource is the first frequency domain information or the second frequency domain information.

Therefore, based on a plurality of resource multiplexing modes supported by the method for transmitting a reference signal in this embodiment of the present invention, practicability of this embodiment of the present invention can be further improved.

In one embodiment, the time domain information is used to indicate a time unit offset between the time unit used for transmitting the first reference signal and the time unit used for transmitting the first uplink channel, and the reference signal corresponding to the first uplink channel is the first reference signal.

In one embodiment, the time domain information is used to indicate an index value of the time unit (or a time unit corresponding to the first resource) used for transmitting the first reference signal.

In one embodiment, the time domain information is used to indicate a time domain location of the first resource (or a time unit corresponding to the first resource).

In one embodiment, the time domain information is used to indicate an index value of a time unit corresponding to the first resource.

In one embodiment, the time domain information is used to indicate an index value of a time interval corresponding to the first resource.

In one embodiment, the time domain information is used to indicate an index value of a symbol corresponding to the first resource.

In one embodiment, the time domain information is used to indicate an index value of a slot corresponding to the first resource.

In one embodiment, the time domain information is used to indicate an index value of a mini-slot corresponding to the first resource.

In one embodiment, the time domain information is used to indicate an index value of a subframe corresponding to the first resource.

In one embodiment, the time domain information is specifically used to indicate a time domain location of a time unit used for transmitting a reference signal in a radio frame or a subframe or a slot or a mini-slot.

In one embodiment, the time domain information is specifically used to indicate a time domain location of a symbol used for transmitting a reference signal in a time unit used for transmission.

In one embodiment, a value of a cyclic shift of each sequence in the first sequence set is a value obtained by rounding up after a value of a cyclic shift of each sequence in a second sequence set is divided by 2, or a value of a cyclic shift of each sequence in the sequence information of the first sequence set is a value obtained by rounding down after a value of a cyclic shift of each sequence in a second sequence set is divided by 2, where a value range of the cyclic shift of the sequence in the second sequence set is 0 to 11.

In one embodiment, a value range of a cyclic shift of the first sequence set is 0 to 5.

In one embodiment, the method further includes: transmitting, by the network device, K pieces of control information to the terminal device, where each of the K pieces of control information is used to instruct the terminal device to transmit a reference signal in a third time unit, K≥2, and the third time unit is a time unit indicated by each of the K pieces of control information and used for carrying the first reference signal, so that the terminal device determines the information about the first resource and the sequence information of the first sequence set based on first control information in the K pieces of control information, where the first control information is a first piece of control information, received by the terminal device, in the K pieces of control information.

In one embodiment, when the first time unit carrying the first reference signal includes three symbols, and the first time unit is the first time unit in a time period, the first reference signal is carried in the second symbol of the first time unit, or the first reference signal is carried in the last symbol of the first time unit.

In one embodiment, when the first time unit carrying the first reference signal includes three symbols, and the first time unit is the last time unit in a time period, the first reference signal is carried in the first symbol of the first time unit, or the first reference signal is carried in the second symbol of the first time unit.

In one embodiment, when the first time unit carrying the first reference signal includes three symbols, and the first time unit is the third time unit in a time period, the first reference signal is carried in the first symbol of the first time unit, or the first reference signal is carried in the second symbol of the first time unit.

In one embodiment, a time period includes six time units.

In one embodiment, the first time unit in a time period includes three symbols, the last time unit in the time period includes three symbols, and each time unit except the first time unit and the last time unit in the time period includes two symbols.

In one embodiment, the third time unit in a time period includes three symbols, the last time unit in the time period includes three symbols, and each time unit except the third time unit and the last time unit in the time period includes two symbols.

In one embodiment, a time period is a subframe, or a time period is one millisecond (ms).

According to a third aspect, an apparatus for transmitting a reference signal is provided and includes units configured to perform the steps of the method in the first aspect and each implementation of the first aspect.

According to a fourth aspect, an apparatus for receiving a reference signal is provided and includes units configured to perform the steps of the method in the second aspect and each implementation of the second aspect.

According to a fifth aspect, a device for transmitting a reference signal is provided and includes a memory and a processor, where the memory is configured to store a computer program, and the processor is configured to invoke and run the computer program in the memory, so that the device for transmitting a reference signal performs the method in the first aspect and any possible implementation of the first aspect.

According to a sixth aspect, a device for receiving a reference signal is provided and includes a memory and a processor, where the memory is configured to store a computer program, and the processor is configured to invoke and run the computer program in the memory, so that the device for receiving a reference signal performs the method in the second aspect and any possible implementation of the second aspect.

According to a seventh aspect, a computer program product is provided, where the computer program product includes computer program code, and when the computer program code is executed by a communications unit, a processing unit, a transceiver, or a processor of a terminal device, the terminal device performs the method in the first aspect or any possible implementation of the first aspect.

According to an eighth aspect, a computer program product is provided, where the computer program product includes computer program code, and when the computer program code is executed by a communications unit, a processing unit, a transceiver, or a processor of a network device, the network device performs the method in the second aspect or any possible implementation of the second aspect.

According to a ninth aspect, a computer-readable storage medium is provided, where the computer-readable storage medium stores a program, and the program enables a terminal device to perform the method in the first aspect or any possible implementation of the first aspect.

According to a tenth aspect, a computer-readable storage medium is provided, where the computer-readable storage medium stores a program, and the program enables a network device to perform the method in the second aspect or any possible implementation of the second aspect.

According to an eleventh aspect, a method for transmitting a reference signal is provided, where the method includes: determining, by a transmit device, a quantity of symbols included in a first time unit carrying a first reference signal and a location of the first time unit in a time period; and when the first time unit includes three symbols, and the first time unit is the first time unit in the time period, transmitting, by the transmit device, the first reference signal in the second symbol of the first time unit; or transmitting, by the transmit device, the first reference signal in the last symbol of the first time unit.

According to a twelfth aspect, a method for transmitting a reference signal is provided, where the method includes: determining, by a transmit device, a quantity of symbols included in a first time unit carrying a first reference signal and a location of the first time unit in a time period; and when the first time unit includes three symbols, and the first time unit is the last time unit in the time period, transmitting, by the transmit device, the first reference signal in the second symbol of the first time unit; or transmitting, by the transmit device, the first reference signal in the first symbol of the first time unit.

According to a thirteenth aspect, a method for transmitting a reference signal is provided, where the method includes: determining, by a transmit device, a quantity of symbols included in a first time unit carrying a first reference signal and a location of the first time unit in a time period; and when the first time unit includes three symbols, and the first time unit is the third time unit in the time period, transmitting, by the transmit device, the first reference signal in the second symbol of the first time unit; or transmitting, by the transmit device, the first reference signal in the first symbol of the first time unit.

According to a fourteenth aspect, a method for receiving a reference signal is provided, where the method includes: determining, by a receive device, a quantity of symbols included in a first time unit carrying a first reference signal and a location of the first time unit in a time period; and when the first time unit includes three symbols, and the first time unit is the first time unit in the time period, receiving, by the receive device, the first reference signal in the second symbol of the first time unit; or receiving, by the transmit device, the first reference signal in the last symbol of the first time unit.

According to a fifteenth aspect, a method for transmitting a reference signal is provided, where the method includes: determining, by a receive device, a quantity of symbols included in a first time unit carrying a first reference signal and a location of the first time unit in a time period; and when the first time unit includes three symbols, and the first time unit is the last time unit in the time period, transmitting, by the receive device, the first reference signal in the second symbol of the first time unit; or transmitting, by the receive device, the first reference signal in the first symbol of the first time unit.

According to a sixteenth aspect, a method for transmitting a reference signal is provided, where the method includes: determining, by a receive device, a quantity of symbols included in a first time unit carrying a first reference signal and a location of the first time unit in a time period; and when the first time unit includes three symbols, and the first time unit is the third time unit in the time period, transmitting, by the receive device, the first reference signal in the second symbol of the first time unit; or transmitting, by the receive device, the first reference signal in the first symbol of the first time unit.

Because a radio frequency of a terminal device may perform power ramp at a start of a subframe, an end of a subframe, or an end of a slot, transmission performance of the last symbol and the first symbol in the subframe is affected. According to the method for transmitting a reference signal and the method for receiving a reference signal in the present invention, a symbol used for carrying a reference signal is determined based on a quantity of symbols included in a time unit carrying the reference signal and a location of the time unit carrying the reference signal in a subframe. This can prevent an uplink reference signal from being transmitted at a start and an end of a subframe, thereby ensuring performance of the uplink reference signal.

In one embodiment, a time period includes six time units.

In one embodiment, the first time unit in a time period includes three symbols, the last time unit in the time period includes three symbols, and each time unit except the first time unit and the last time unit in the time period includes two symbols.

In one embodiment, the third time unit in a time period includes three symbols, the last time unit in the time period includes three symbols, and each time unit except the third time unit and the last time unit in the time period includes two symbols.

In one embodiment, a time period is a subframe, or a time period is one millisecond (ms).

In one embodiment, the transmit device is a network device, and the receive device is a terminal device.

In one embodiment, the transmit device is a terminal device, and the receive device is a network device.

According to a seventeenth aspect, an apparatus for transmitting a reference signal is provided and includes units configured to perform the steps of the method in each implementation of the eleventh aspect to the thirteenth aspect.

According to an eighteenth aspect, an apparatus for receiving a reference signal is provided and includes units configured to perform the steps of the method in each implementation of the fourteenth aspect to the sixteenth aspect.

According to a nineteenth aspect, a device for transmitting a reference signal is provided and includes a memory and a processor, where the memory is configured to store a computer program, and the processor is configured to invoke and run the computer program in the memory, so that the device for transmitting a reference signal performs the method in each implementation of the eleventh aspect to the thirteenth aspect.

According to a twentieth aspect, a device for receiving a reference signal is provided and includes a memory and a processor, where the memory is configured to store a computer program, and the processor is configured to invoke and run the computer program in the memory, so that the device for receiving a reference signal performs the method in each implementation of the fourteenth aspect to the sixteenth aspect.

According to a twenty-first aspect, a computer program product is provided, where the computer program product includes computer program code, and when the computer program code is executed by a communications unit, a processing unit, a transceiver, or a processor of a terminal device, the communications device performs the method in each implementation of the eleventh aspect to the thirteenth aspect.

According to a twenty-second aspect, a computer-readable storage medium is provided, where the computer-readable storage medium stores a program, and the program enables a communications device to perform the method in each implementation of the fourteenth aspect to the sixteenth aspect.

DESCRIPTION OF EMBODIMENTS

Figure 1:
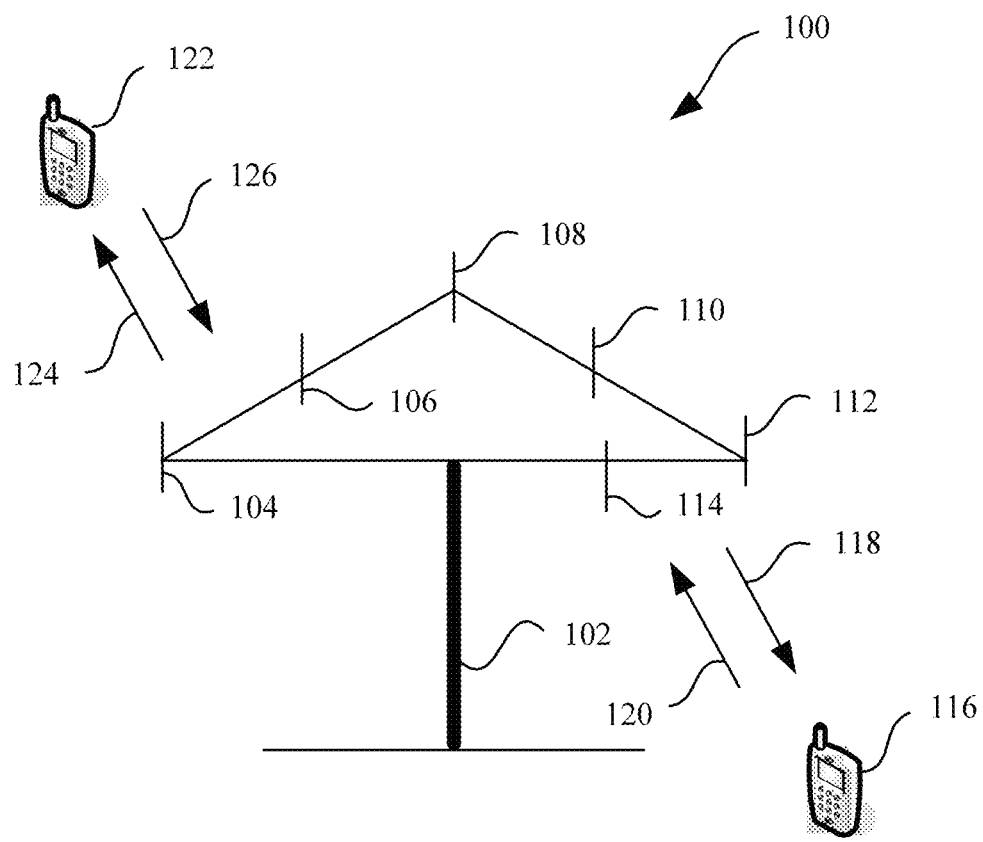
FIG. 1 is a schematic architectural diagram of a communications system to which a method and an apparatus for transmitting a reference signal and a method and an apparatus for receiving a reference signal are applicable according to an embodiment of the present invention.

The following clearly and completely describes the technical solutions in the embodiments of the present invention with reference to the accompanying drawings in the embodiments of the present invention.

The terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with another system by using the signal).

It should be understood that the embodiments of the present invention may be applied to various communications systems, such as a global system for mobile communications (GSM), a code division multiple access (CDMA) system, a wideband code division multiple access (WCDMA) system, a general packet radio service (GPRS), a long term evolution (LTE) system, an advanced long term evolution (LTE-A) system, a universal mobile telecommunications system (UMTS), or a next-generation communications system.

Usually, a quantity of connections supported by a conventional communications system is limited and is also easy to implement. However, with development of communications technologies, a mobile communications system not only supports conventional communication but also supports, for example, device to device (D2D) communication, machine to machine (M2M) communication, machine type communication (MTC), and vehicle to vehicle (V2V) communication.

The embodiments of the present invention are described with reference to a network device and a terminal device.

The terminal device may be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a wireless local area network (WLAN), may be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, an in-vehicle device, a wearable device, a terminal device in a next generation communications system such as a future 5th generation (5G) network, a terminal device in a future evolved public land mobile network (PLMN), or a terminal device in a new radio (NR) communications system.

As an example rather than a limitation, in the embodiments of the present invention, the terminal device may also be a wearable device. A wearable device may also be referred to as a wearable intelligent device, and is a general term for wearable devices such as glasses, gloves, watches, clothes, and shoes that are developed by applying wearable technologies in intelligent designs of daily wear. A wearable device is a portable device that can be directly worn on a body or integrated into clothes or an accessory of a user. A wearable device is not merely a hardware device, but is used to implement a powerful function through software support, data interaction, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In addition, the network device may be a network device such as a device configured to communicate with a mobile device. The network device may be an access point (AP) in a WLAN or a base station (BTS) in GSM or CDMA, or may be a base station (NodeB, NodeB) in WCDMA, or may be an evolved base station (Evolved NodeB, eNB or eNodeB) in LTE, a relay station or an access point, an in-vehicle device, a wearable device, a network device in a future 5G network, a network device in a future evolved PLMN network, a new generation base station (new generation NodeB, gNodeB) in an NR system, or the like.

In addition, in the embodiments of the present invention, the network device provides a service for a cell. The terminal device communicates with the network device by using a transmission resource (for example, a frequency domain resource or a spectrum resource) used by the cell. The cell may be a cell corresponding to the network device (for example, a base station). The cell may belong to a macro base station, or may belong to a base station corresponding to a small cell (small cell). Herein the small cell may include a metro cell, a micro cell, a pico cell, a femto cell, or the like. The cells feature small coverage and low transmit power, and are used to provide high-rate data transmission services.

In addition, in the LTE system or the 5G system, a plurality of intra-frequency cells may simultaneously work on a carrier. In some special scenarios, it may also be considered that concepts of the carrier and the cell are equivalent. For example, in a carrier aggregation (CA) scenario, when a secondary carrier is configured for UE, a carrier index of the secondary carrier and a cell identity (Cell ID) of a secondary cell working on the secondary carrier are both carried. In this case, it may be considered that the concepts of the carrier and the cell are equivalent. For example, for the UE, accessing a carrier is equivalent to accessing a cell.

A method and an apparatus provided in the embodiments of the present invention may be applied to a terminal device or a network device. The terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing by using a process, such as a Linux operating system, a UNIX operating system, an Android operating system, an iOS operating system, or a Windows operating system. The application layer includes applications such as a browser, a contact list, word processing software, and instant communication software. In addition, the embodiments of the present invention do not particularly limit a specific structure of an execution body of the method provided in the embodiments of the present invention, provided that a program recording code of the method provided in the embodiments of the present invention can be run to implement communication according to the method provided in the embodiments of the present invention. For example, the execution body of the method provided in the embodiments of the present invention may be a terminal device or a network device, or may be a function module capable of invoking and executing a program in the terminal device or the network device.

In addition, each aspect or feature of the embodiments of the present invention may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage device (for example, a hard disk, a floppy disk, or a magnetic tape), an optical disc (for example, a compact disc (CD), a digital versatile disc (DVD), a smart card, and a flash memory (for example, an erasable programmable read-only memory (EPROM), a card, a stick, or a key drive). In addition, various storage media described in this specification may indicate one or more devices and/or other machine-readable media that are used to store information. The term "machine-readable media" may include but is not limited to a radio channel, and various other media that can store, contain, and/or transmit an instruction and/or data.

FIG. 1 is a schematic diagram of a wireless communications system according to an embodiment of the present invention. As shown in FIG. 1, the communications system 100 includes a network device 102. The network device 102 may include one or more antennas, for example, antennas 104, 106, 108, 110, 112, and 114. In addition, the network device 102 may additionally include a transmitter chain and a receiver chain. It can be understood by a person of ordinary skill in the art that both the transmitter chain and the receiver chain may include a plurality of components that are related to signal transmission and reception (such as a processor, a modulator, a multiplexer, a demodulator, a demultiplexer, or an antenna).

The network device 102 may communicate with a plurality of terminal devices (such as a terminal device 116 and a terminal device 122). However, it can be understood that the network device 102 may communicate with any quantity of terminal devices similar to the terminal device 116 or 122. The terminal devices 116 and 122 may be cellular phones, smartphones, portable computers, handheld communications devices, handheld computing devices, satellite radio apparatuses, global positioning systems, PDAs, and/or any other appropriate devices that are configured to perform communication in the wireless communications system 100.

As shown in FIG. 1, the terminal device 116 communicates with the antennas 112 and 114. The antennas 112 and 114 transmit information to the terminal device 116 by using a forward link (also referred to as a downlink) 118, and receive information from the terminal device 116 by using a reverse link (also referred to as an uplink) 120. In addition, the terminal device 122 communicates with the antennas 104 and 106. The antennas 104 and 106 transmit information to the terminal device 122 by using a forward link 124, and receive information from the terminal device 122 by using a reverse link 126.

For example, in a frequency division duplex (FDD) system, for example, the forward link 118 may use a frequency band different from that used by the reverse link 120, and the forward link 124 may use a frequency band different from that used by the reverse link 126.

For another example, in a time division duplex (TDD) system or a full duplex system, a same frequency band may be used for the forward link 118 and the reverse link 120, and a same frequency band may be used for the forward link 124 and the reverse link 126.

Each antenna (or an antenna group including a plurality of antennas) and/or a region that are/is designed for communication are/is referred to as a sector of the network device

102. For example, an antenna group may be designed to communicate with a terminal device that is in a sector of a coverage area of the network device 102. The network device may transmit signals to all terminal devices in a corresponding sector by using a single antenna or multi-antenna transmit diversity. In a process of communicating with the terminal devices 116 and 122 by the network device 102 by using the forward links 118 and 124 respectively, transmit antennas of the network device 102 may use beamforming to improve signal-to-noise ratios of the forward links 118 and 124. In addition, compared with a manner in which a network device uses a single antenna or multi-antenna transmit diversity to transmit signals to all terminal devices served by the network device, when the network device 102 uses beamforming to transmit signals to the terminal devices 116 and 122 that are randomly scattered in the related coverage area, interference to a mobile device in a neighboring cell is less.

Within a given time, the network device 102, the terminal device 116, or the terminal device 122 may be a wireless communications transmit apparatus and/or a wireless communications receive apparatus. During data transmission, the wireless communications transmit apparatus may encode data for use in transmission. In one embodiment, the wireless communications transmit apparatus may obtain (for example, generate, receive from another communications apparatus, or store in a memory) a quantity of data bits that need to be transmitted to the wireless communications receive apparatus by using a channel. These data bits may be included in a transport block (or a plurality of transport blocks) of the data, and the transport block may be segmented to generate a plurality of code blocks.

In addition, the communications system 100 may be a PLMN network, a D2D network, an M2M network, or another network. FIG. 1 is merely a simplified schematic diagram of an example. The network may further include another network device, which is not drawn in FIG. 1.

The following describes in detail a transmission object in the embodiments of the present invention.

Specifically, the transmission object in the embodiments of the present invention may be a reference signal (RS), which may alternatively be referred to as a pilot signal (Pilot Signal). It is a known signal provided by a transmit device to a receive device and used for channel estimation, channel sounding, channel demodulation, or the like.

In the embodiments of the present invention, the reference signal may be applied to a physical layer, and is not used to transmit data information coming from a higher layer.

In addition, in the embodiments of the present invention, the reference signal may be a reference signal used for uplink transmission, that is, an uplink reference signal.

The uplink reference signal includes a demodulation reference signal (DMRS) used for uplink demodulation, a sounding reference signal (SRS) used for uplink channel measurement, or the like. A DMRS used for PUCCH demodulation is referred to as a PUCCH DMRS, and a DMRS used for PUSCH demodulation is referred to as a PUSCH DMRS.

For example, in one embodiment of the present invention, a channel (for example, a PUSCH) corresponding to a reference signal (to be specific, an uplink reference signal) may be used to transmit modulated data information. Therefore, the reference signal may be used to demodulate the data information, and the reference signal is also referred to as a reference signal of the channel.

As an example rather than a limitation, the signal used for channel demodulation may be illustrated, for example, a DMRS or a common reference signal (CRS).

In addition, a specific method and process of "data channel demodulation" in the embodiments of the present invention may be similar to those in the prior art. Herein, to avoid repetition, a detailed description thereof is omitted.

For another example, in one embodiment, a channel (for example, a PUCCH) corresponding to a reference signal (to be specific, an uplink reference signal) may be used to transmit modulated control information. Therefore, the reference signal may be used to demodulate the control information, and the reference signal is also referred to as a reference signal of the channel.

As an example rather than a limitation, the signal used for channel demodulation may be illustrated, for example, a DMRS or a CRS.

In addition, a specific method and process of "control channel demodulation" in the embodiments of the present invention may be similar to those in the prior art. Herein, to avoid repetition, detailed descriptions thereof are omitted.

It should be understood that, functions of the reference signal in the embodiments of the present invention illustrated above are merely examples for description. However, embodiments of the present invention are not limited thereto. For example, in one embodiment of the present invention, the reference signal may be further used for, for example, channel measurement (or channel state information measurement), phase compensation, automatic gain control AGC adjustment, time-frequency synchronization, or radio resource management RRM measurement.

In one embodiment, one reference signal may include one or more layers of sub reference signals, where a plurality of layers of sub reference signals may correspond to a channel of a same terminal device, or may correspond to channels of different terminal devices. A sub reference signal at each layer corresponds to a layer index value, and the sub reference signal at each layer may use different sequences. In the embodiments of the present invention, sequences respectively used by a plurality of layers of sub reference signals included in one reference signal are referred to as a sequence set corresponding to the reference signal.

Alternatively, in one embodiment, one sequence set may include Q sequences, where $Q \geq 1$, a value of Q may be determined based on a quantity of layers of the reference signal (or a quantity of included sub reference signals), and layer index values are 0 to $Q-1$.

In one embodiment, a network device may transmit, to a terminal device, sequence information of a sequence (or a sequence set) used by a reference signal of the terminal device, so that the terminal device determines, based on the sequence information, the sequence used for the reference signal.

In one embodiment, "sequence information" may be a specific sequence included in the sequence set; or "sequence information" may be a specific sequence used by a sequence included in the sequence set, or a layer index value corresponding to a specific sequence; or "sequence information" may be a cyclic shift used by a sequence included in the sequence set; or "sequence information" may be a cyclic shift used by a sequence included in the sequence set and a layer index value corresponding to the cyclic shift. This is not particularly limited in the present invention, provided that the terminal device can determine, based on the sequence information, each sequence included in the sequence set allocated by the network device.

For example, in one embodiment of the present invention, a communications system or a communication protocol may specify a reference sequence set (that is, a second sequence set). In addition, as an example rather than a limitation, the reference sequence may include Q sequences. Therefore, the Q sequences that the sequence set may include may correspond, on a one-to-one basis, to the Q sequences that the reference sequence may include. For example, a value of a cyclic shift of a sequence #i' in the sequence set may be a value obtained by rounding up or rounding down after a value of a cyclic shift of a sequence #i in the reference sequence is divided by a preset value (for example, 2) specified by the system, where i□[1, N].

It should be noted that, in the embodiments of the present invention, "cyclic shift" may indicate the cyclic shift itself, or "cyclic shift" may further indicate an intermediate variable used to calculate a cyclic shift of a sequence.

The following describes in detail resources for transmitting a reference signal.

1. Time Domain

In one embodiment, resources used for transmitting information by the network device and the terminal device may be divided into a plurality of time units in time domain.

In addition, in one embodiment of the present invention, the plurality of time units may be continuous, or preset intervals may be set between some adjacent time units. This is not particularly limited in the embodiments of the present invention.

In one embodiment of the present invention, a duration of a time unit may be set randomly. This is not particularly limited in the embodiments of the present invention.

For example, a time unit may include one or more subframes.

Alternatively, a time unit may include one or more slots.

Alternatively, a time unit may include one or more mini-slots.

Alternatively, a time unit may include one or more symbols.

Alternatively, a time unit may include one or more transmission time intervals (Transmission Time Interval, TTI).

Alternatively, a time unit may include one or more short transmission time intervals (short Transmission Time Interval, sTTI).

Alternatively, a time unit may correspond to a time mode, where if a first time mode is a transmission time interval of two symbols or three symbols, a second mode is a transmission time interval of seven symbols.

A mini-slot includes one or more symbols, and the mini-slot is shorter than or equal to a slot. Herein the slot may be a mini-slot in a system with a 60 kHz subcarrier spacing, or may be a mini-slot in a system with a 15 kHz subcarrier spacing. This is not limited in the present invention.

A slot includes one or more symbols. Herein the slot may be a slot in a system with a 60 kHz subcarrier spacing, or may be a slot in a system with a 15 kHz subcarrier spacing. This is not limited in the present invention.

A TTI is a parameter commonly used in a current communications system (for example, an LTE system), and is a scheduling unit for scheduling data transmission in a radio link. In the prior art, usually it is considered that one TTI is equal to 1 ms. To be specific, one TTI is a duration of one subframe (subframe), or two slots (slot), and is a basic time unit managed in radio resource management (scheduling, or the like).

In a communications network, a latency is a key performance indicator, and also affects use experience of a user. With development of the communication protocol, a physical layer scheduling interval that obviously affects the latency also becomes shorter. A scheduling interval in earlier WCDMA is 10 ms, a scheduling interval in high-speed packet access (HSPA) is shortened to 2 ms, and a time interval (that is, a TTI) in long term evolution (LTE) is shortened to 1 ms.

Due to a low-latency service requirement, a structure of a shorter TTI frame needs to be introduced in a physical layer to further shorten the scheduling interval and improve user experience. For example, a duration of a TTI in the LTE system may be shortened from 1 ms to a range of 1 symbol (symbol) to 1 slot (including 7 symbols). The foregoing symbol may be an orthogonal frequency division multiplexing (OFDM) symbol or a single carrier-frequency division multiple access (SC-FDMA) symbol in the LTE system, or may be a symbol in another communications system. For another example, a duration of a transmission unit in a 5G communications system is also shorter than or equal to 1 ms.

In data transmission based on a TTI whose duration is 1 ms in the LTE system, generally a round-trip time (RTT) of data transmission is 8 ms. It is assumed that, in comparison with an existing TTI whose duration is 1 ms, a processing time is shortened proportionally, that is, still complying with an existing RTT latency. In this case, in data transmission based on an sTTI whose duration is 0.5 ms, an RTT of data transmission is 4 ms. In comparison with data transmission based on the TTI whose duration is 1 ms, the latency can be shortened by half. Therefore, user experience is improved.

A TTI whose duration is shorter than 1 ms may be referred to as an sTTI. For example, in the LTE system, a duration of an sTTI may be any duration of 1-7 symbols, or durations of sTTIs may be a combination of at least two different durations of 1-7 symbols. For example, 1 ms includes 6 sTTIs, where durations of the sTTIs may be 3 symbols, 2 symbols, 2 symbols, 2 symbols, 2 symbols, and 3 symbols; or 1 ms includes 4 sTTIs, where durations of the sTTIs may be 3 symbols, 4 symbols, 3 symbols, and 4 symbols. Alternatively, durations of sTTIs may be a combination of other different durations.

In addition, a duration of an uplink sTTI may be the same as a duration of a downlink sTTI. For example, the duration of the uplink sTTI and the duration of the downlink sTTI are both 2 symbols.

Alternatively, a duration of an uplink sTTI may be longer than a duration of a downlink sTTI. For example, the duration of the uplink sTTI is 7 symbols, and the duration of the downlink sTTI is 2 symbols.

Alternatively, a duration of an uplink sTTI may be shorter than a duration of a downlink sTTI. For example, the duration of the uplink sTTI is 4 symbols, and the duration of the downlink sTTI is 1 subframe.

A data packet whose TTI duration is shorter than 1 subframe or 1 ms is referred to as a short-TTI data packet. Short-TTI data is distributed continuously or discontinuously for transmission in frequency domain. It should be noted that, considering backward compatibility, data transmission based on a TTI whose duration is 1 ms and data transmission based on an sTTI may exist simultaneously in the system.

In one embodiment of the present invention, a TTI (for example, a TTI whose duration is 1 ms or longer than 1 ms) and an sTTI that are specified by the prior art (for example, the LTE system) may be collectively referred to as a TTI. In addition, in the embodiments of the present invention, a duration of a TTI may be changed based on an actual requirement.

It should be understood that, a structure of the time unit illustrated above is merely an example for description. This is not particularly limited in the embodiments of the present invention. The structure of the time unit may be changed randomly based on an actual requirement. For example, for an LTE system not supporting the sTTI, one time unit may be one subframe. For another example, for an LTE system supporting the sTTI, one time unit may include one sTTI, or one time unit may include one slot, or one time unit may include one or more (for example, a positive integer less than 7 or a positive integer less than 6) symbols; or one time unit may be one subframe.

It should be noted that in the embodiments of the present invention, a length used for information transmission (or information transmission duration) in the time unit may be 1 ms, or may be less than 1 ms. Alternatively, in combination with the foregoing descriptions, even though for the LTE system that does not support the sTTI, when the time unit is represented by a subframe, a length used for downlink information transmission in the time unit may be 1 ms, or may be less than 1 ms. Similarly, a length used for uplink information transmission in the time unit may be 1 ms, or may be less than 1 ms.

For ease of understanding and description, as an example rather than a limitation, a process of transmitting a reference signal in the embodiments of the present invention is hereinafter described in detail by using an example in which one time unit includes one sTTI and one sTTI includes two symbols.

In addition, in one embodiment of the present invention, resources used for transmitting information by the network device and the terminal device may be divided into a plurality of time periods in time domain, and each time period includes one or more time units.

Figure 3:
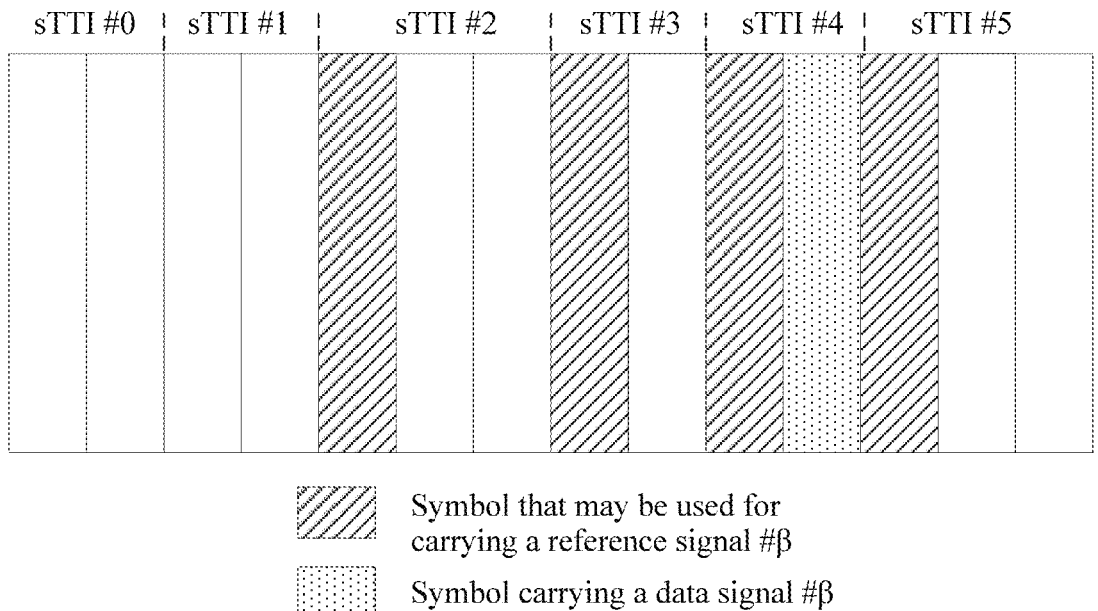
FIG. 3 is a schematic diagram of a time domain location of a reference signal according to an embodiment of the present invention.
Figure 4:
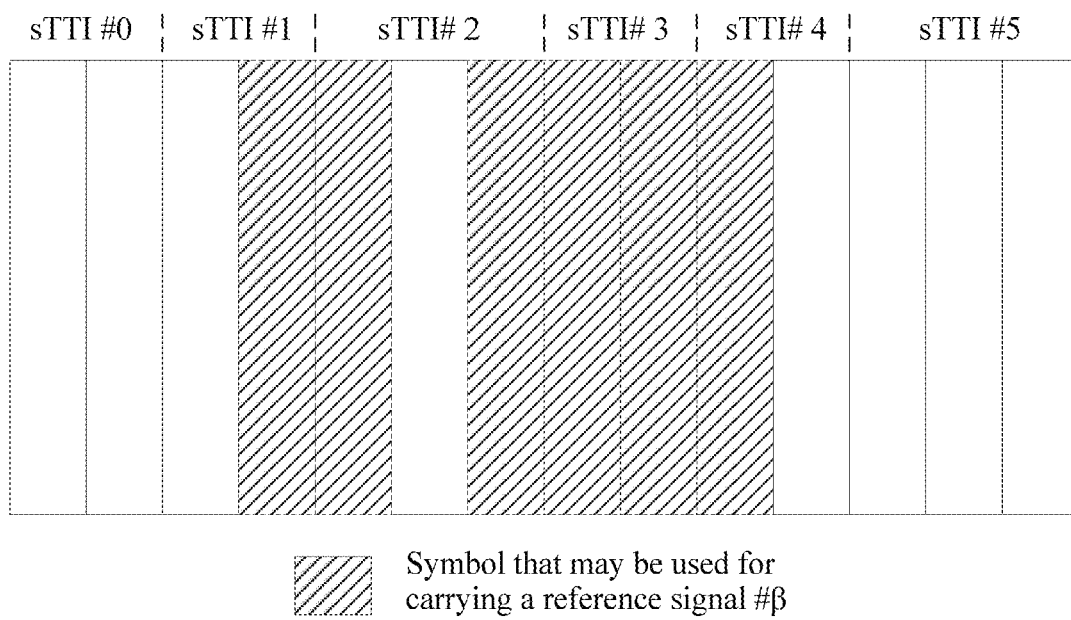
FIG. 4 is a schematic diagram of a time domain location of a reference signal according to an embodiment of the present invention.
Figure 5:
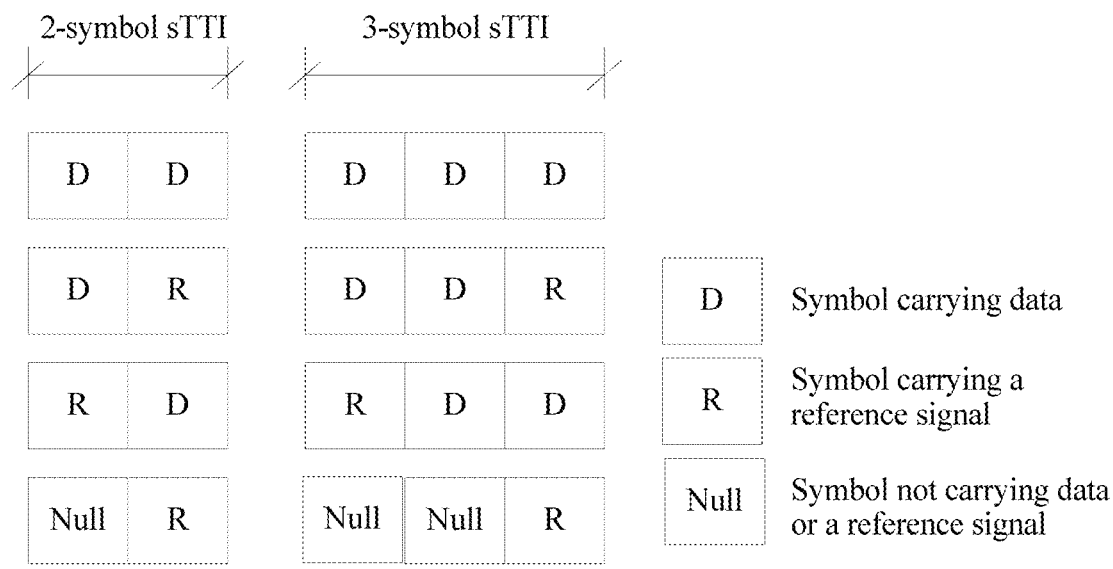
FIG. 5 is a schematic diagram of a time domain location of a reference signal according to an embodiment of the present invention.

As an example rather than a limitation, in the embodiments of the present invention, one time period may be 1 ms or 10 ms. As shown in FIG. 3 to FIG. 5, in the embodiments of the present invention, one time period may include, for example, 6 time units or 2 time units.

As an example rather than a limitation, in one embodiment of the present invention, a location of a time domain resource (denoted as a time domain resource #β) used for transmitting a reference signal may include the following meanings.

Meaning 1

In one embodiment of the present invention, the location of the time domain resource #β may be a position of the time domain resource #β relative to a time domain resource (denoted as a time domain resource #γ) used for transmitting an uplink channel. Herein the reference signal may be a reference signal used for the uplink channel.

As an example rather than a limitation, p (for example, p=4) time units (for example, sTTIs) used for transmitting the reference signal may exist in a time period, or there are p possible positions for the time unit of the reference signal in a time period. Assuming that the uplink channel is transmitted in an $n^{th}$ time unit (to be specific, the time domain resource #γ is the $n^{th}$ time unit in the time period, or is a $c^{th}$ symbol in the $n^{th}$ time unit in the time period) in the time period, the p time units (that is, the time domain resource #β) used for transmitting the reference signal may be an $(n-2)^{th}$ time unit, an $(n-1)^{th}$ time unit, an $n^{th}$ time unit, and an $(n+1)^{th}$ time unit in the time period, where n≥3. Alternatively, the p time units (that is, the time domain resource #β) used for transmitting the reference signal may be an $a^{th}$ symbol in an $(n-2)^{th}$ time unit, a $b^{th}$ symbol in an $(n-1)^{th}$ time unit, a $c^{th}$ symbol in an $n^{th}$ time unit, and a $d^{th}$ symbol in an $(n+1)^{th}$ time unit in the time period, where n≥3.

For example, as shown in FIG. 3, the uplink channel is transmitted in a time unit #4 (that is, a fifth time unit in the time period). In this case, the time unit used for transmitting the reference signal in the time period may be a time unit #2, a time unit #3, a time unit #4, or a time unit #5.

Meaning 2

In one embodiment of the present invention, the location of the time domain resource (that is, the time domain resource #β) used for transmitting the reference signal may be an absolute location of the time domain resource #β in a time domain resource (for example, in each time period) provided by the communications system.

As an example rather than a limitation, for example, as shown in FIG. 4, p (for example, p=4) time units (for example, sTTIs) used for transmitting the reference signal may exist in each time period. In addition, as an example rather than a limitation, as shown in FIG. 4, the p time units used for transmitting the reference signal may be a second time unit (for example, a time unit #1 in FIG. 4), a third time unit (for example, a time unit #2 in FIG. 4), a fourth time unit (for example, a time unit #3 in FIG. 4), and a fifth time unit (for example, a time unit #4 in FIG. 4) in each time period. To be specific, the time domain resource #γ may be any time unit from the time unit #1 to the time unit #4.

It should be noted that, the reference signal may be transmitted in all symbols of a time unit, or the reference signal may be transmitted in some symbols in a time unit. This is not particularly limited in the present invention. For example, as shown in FIG. 4, the reference signal is transmitted in some symbols in the time unit #1, the time unit #2, and the time unit #4. The reference signal is transmitted in all symbols of the time unit #3.

In addition, for any two time units used for transmitting the reference signal, locations of symbols used for transmitting the reference signal may be the same or may be different. This is not particularly limited in the present invention. For example, as shown in FIG. 4, the reference signal is transmitted in a second symbol in the time unit #1. The reference signal is transmitted in the first symbol and a third symbol in the time unit #2. The reference signal is transmitted in all symbols of the time unit #3. The reference signal is transmitted in the first symbol in the time unit #4.

Meaning 3

In one embodiment of the present invention, the location of the time domain resource #β may be a location in a time unit. For example, when the time domain resource #β is a symbol, the location of the time domain resource #β may be a location of the symbol in a time unit.

For example, as shown in FIG. 5, when the time domain resource #β is one symbol, and when the time domain resource #γ includes two symbols and an $n^{th}$ time unit (for example, in a time period) includes the time domain resource #γ, where n∈[0, N−1], and N is a quantity of time units included in the time period, the location of the time domain resource #β may include the following presentation form:

The $n^{th}$ time unit may not include the time domain resource #β, or may not include the time domain resource #β.

If the $n^{th}$ time unit includes the time domain resource #β, the time domain resource #β may be located before the time domain resource #γ, or the time domain resource #β may be located after the time domain resource #γ. For example, the time domain resource #β may be located before the first symbol in the $n^{th}$ time unit, or the time domain resource #β may be located in the last symbol in the $n^{th}$ time unit.

If the $n^{th}$ time unit does not include the time domain resource #β, the time domain resource #β may be located before the $n^{th}$ time unit, or the time domain resource #β may be located after the $n^{th}$ time unit. For example, the time domain resource #β may be located before the first symbol before the $n^{th}$ time unit, or the time domain resource #β may be located in the first symbol after the $n^{th}$ time unit.

For another example, as shown in FIG. 5, when the time domain resource #β is one symbol, and when the $n^{th}$ time unit includes three symbols, the location of the time domain resource #β may include the following presentation form:

The $n^{th}$ time unit may not include the time domain resource #β, or the $n^{th}$ time unit may not be used to transmit the reference signal. As an example rather than a limitation, in this case, all symbols in the $n^{th}$ time unit may be used for transmitting the uplink channel, or symbols in the $n^{th}$ time unit may not be used for transmitting the uplink channel.

If the $n^{th}$ time unit includes the time domain resource #β and the $n^{th}$ time unit includes the time domain resource #γ, the time domain resource #β may be located before the time domain resource #γ, or the time domain resource #β may be located after the time domain resource #γ, or the time domain resource #β may be located between two time domain resources #γ.

If the $n^{th}$ time unit includes the time domain resource #β and the $n^{th}$ time unit does not include the time domain resource #γ, the time domain resource #β may be located before the first symbol in the $n^{th}$ time unit, or the time domain resource #β may be located in the last symbol in the $n^{th}$ time unit, or the time domain resource #β may be located in a symbol in a middle position in the $n^{th}$ time unit.

2. Frequency Domain

In one embodiment of the present invention, resources used for transmitting information by the network device and the terminal device may be divided into a plurality of frequency domain units in frequency domain.

In addition, in the embodiments of the present invention, the plurality of frequency domain units may be continuous, or preset intervals may be set between some adjacent frequency domain units. This is not particularly limited in the embodiments of the present invention. For example, a preset interval is 1, or 3, or 5, or 1+2y, where y is an integer.

In one embodiment of the present invention, a size of a frequency domain unit may be set randomly. This is not particularly limited in the embodiments of the present invention. For example, a frequency domain unit may include one or more subcarriers. A subcarrier is 15 kHz, or an integer multiple of 15 kHz.

It should be noted that, in the embodiments of the present invention, the communications system or the communication protocol may specify a plurality of locations of frequency domain units that may be used by reference signals on frequency domain resources provided by the system, or the communications system or the communication protocol may specify a plurality of patterns of frequency domain resources that may be used by reference signals.

For example, each terminal device in the communications system uses a frequency division multiplexing mode, for example, an interleaved frequency division multiple access (IFDMA) mode. When the frequency domain resources provided by the system are used for transmitting the reference signals, the frequency domain resources (for example, the frequency domain units included in the communications system) of the communications system may be divided into a plurality of patterns, where frequency domain resources included in any two patterns in the plurality of patterns are different. For example, the frequency domain resources are a subcarrier whose subcarrier index value is odd and an even subcarrier whose subcarrier index value is even, or a subcarrier whose subcarrier index value is 4z, an even subcarrier whose subcarrier index value is 4z+1, a subcarrier whose subcarrier index value is 4z+2, and an even subcarrier whose subcarrier index value is 4z+3, where z is an integer.

Figure 6:
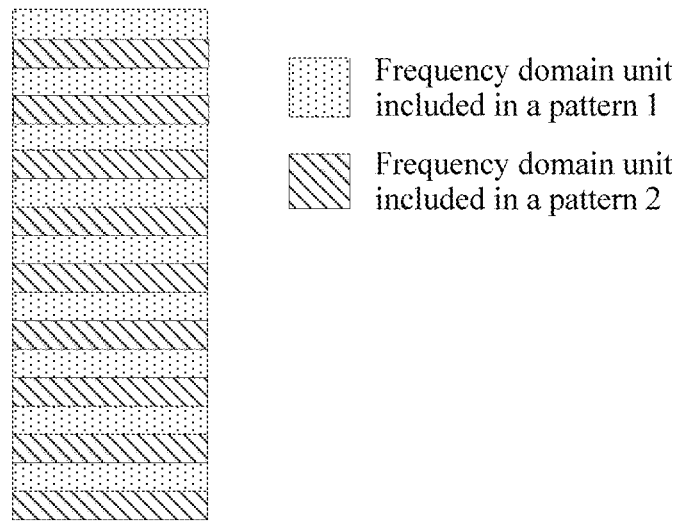
FIG. 6 is a schematic diagram of a frequency domain location of a reference signal according to an embodiment of the present invention.

FIG. 6 shows patterns obtained by dividing frequency domain resources used for transmitting reference signals. As shown in FIG. 6, when a frequency domain resource of a reference signal of a terminal device in a communications system is a frequency domain pattern of a frequency division multiplexing mode, a frequency domain unit corresponding to a pattern 1 may be allocated to a terminal device, and a frequency domain unit corresponding to a pattern 2 may be allocated to another terminal device. Therefore, the two terminal devices can use different frequency domain resources to transmit reference signals in a same time period, and accuracy and reliability of transmission of the reference signal by each terminal device can be ensured. Alternatively, the pattern 1 and the pattern 2 may be allocated to a same terminal device, so that accuracy and reliability of the terminal device between different layers of signals can be implemented in a same time period.

For example, as an example rather than a limitation, one of the pattern 1 and the pattern 2 may be a pattern corresponding to a subcarrier whose subcarrier index value is odd, and the other one of the pattern 1 and the pattern 2 may be a pattern corresponding to a subcarrier whose subcarrier index value is even.

It should be understood that, the division of frequency domain resources illustrated above is merely an example for description. However, the present invention is not limited thereto. In the embodiments of the present invention, the frequency domain resources may be further divided into more than two (for example, four) patterns.

Figure 7:
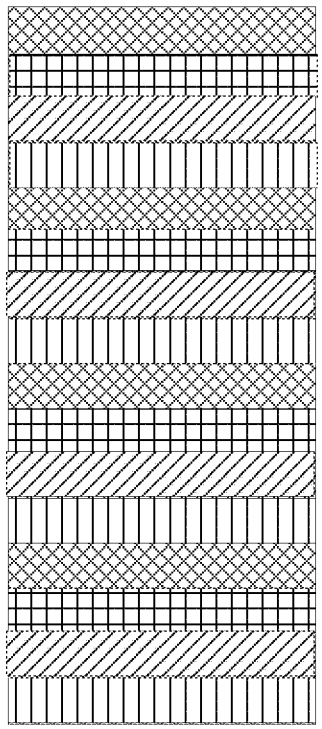
FIG. 7 is a schematic diagram of a frequency domain location of a reference signal according to an embodiment of the present invention.

FIG. 7 shows another example of patterns obtained by dividing frequency domain resources used for transmitting reference signals. As shown in FIG. 7, when a frequency domain resource of a reference signal of a terminal device in a communications system is a frequency domain pattern of a frequency division multiplexing mode, a frequency domain unit corresponding to a pattern 1 may be allocated to a terminal device, a frequency domain unit corresponding to a pattern 2 may be allocated to another terminal device, a frequency domain unit corresponding to a pattern 3 may be allocated to still another terminal device, and a frequency domain unit corresponding to a pattern 4 may be allocated to still another terminal device. Therefore, the four terminal devices can use different frequency domain resources to transmit reference signals in a same time period, and accuracy and reliability of transmission of the reference signal by each terminal device can be ensured. Alternatively, the pattern 1, the pattern 2, the pattern 3, and the pattern 4 may be allocated to a same terminal device, so that accuracy and reliability of the terminal device between different layers of signals can be implemented in a same time period.

In addition, as an example rather than a limitation, in the embodiments of the present invention, a terminal device may use only one pattern in a process of transmitting a reference signal.

Alternatively, in one embodiment of the present invention, a terminal device may use a plurality of (at least two) patterns in a process of transmitting a reference signal. For example, different patterns may be used by different layers (or different sub reference signals) of a same reference signal. For example, it is assumed that a reference signal includes four layers of sub reference signals, where a pattern used by a sub reference signal at a layer 0 or a layer 1 is different from a pattern used by a sub reference signal at a layer 0 or a layer 1, or an attribute of a subcarrier index value used by a sub reference signal at a layer 0 or a layer 1 is different from an attribute of a subcarrier index value used by a sub reference signal at a layer 0 or a layer 1, where the attribute of the subcarrier index value may be odd or even, or may be 4m or 4m+1 or 4m+2 or 4m+3, and m is an integer.

Similarly, in one embodiment of the present invention, when a frequency domain resource of a reference signal of a terminal device in the communications system is in a code division multiplexing mode, for example, a code division multiplexing (Code Division Multiplexing, CDM) mode, when a frequency domain resource provided by the system is used for transmitting a reference signal, the frequency domain resource (for example, each frequency domain unit included in the communications system) of the communications system may be divided into one or more patterns. As an example rather than a limitation, when the frequency domain resource of the reference signal of the terminal device in the communications system is a pattern of the code division multiplexing mode, a plurality of terminal devices in the communications system may use the frequency domain resource corresponding to the same pattern to transmit reference signals. To be specific, the frequency domain resource (for example, each frequency domain unit included in the communications system) in the communications system may be assigned to the same pattern, where the pattern may include all or some frequency domain units or some continuous frequency domain units in the communications system. This is not particularly limited in the present invention.

Figure 8:
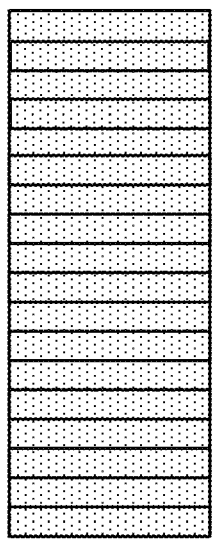
FIG. 8 is a schematic diagram of a frequency domain location of a reference signal according to an embodiment of the present invention.

FIG. 8 shows another example of patterns obtained by dividing frequency domain resources used for transmitting reference signals. As shown in FIG. 8, when a frequency domain resource of a reference signal of a terminal device in a communications system is a pattern of a code division multiplexing mode, the frequency domain resource (for example, each frequency domain unit included in the communications system) of the communications system may be assigned to the same pattern. To be specific, the pattern may include all or some frequency domain units or some continuous frequency domain units in the communications system. Therefore, different terminal devices can use different code domain resources (for example, a cyclic shift of a sequence of a reference signal), and multiplex reference signals onto the frequency domain resource corresponding to the pattern for transmission. Therefore, two terminal devices can use the same frequency domain resource to transmit reference signals based on different code domain resources in a same time period. Therefore, accuracy and reliability of transmission of the reference signal by each terminal device can be ensured, and frequency domain resource consumption is reduced.

In addition, the described "pattern" is only one of manners of distinguishing frequency domain locations of resources, and is not particularly limited in the present invention. All other description manners that can distinguish frequency domain locations of resources shall fall within the protection scope of the present invention. For example, "pattern" may also be referred to as "structure (structure)" or "comb (comb)".

It should be noted that, in one embodiment of the present invention, a terminal device may use all of frequency domain units included in a pattern; or a terminal device may use a part of frequency domain units included in a pattern; or a terminal device may use some continuous frequency domain units in frequency domain units included in a pattern. This is not particularly limited in the present invention.

In addition, in one embodiment of the present invention, in a pattern corresponding to a symbol, frequency domain units included in the pattern in the symbol may be all allocated to a terminal device; or frequency domain units included in the pattern in the symbol may be allocated to a plurality of terminal devices, and in the pattern, frequency domain units used by the terminal devices are different or the same. This is not particularly limited in the present invention.

Figure 2:
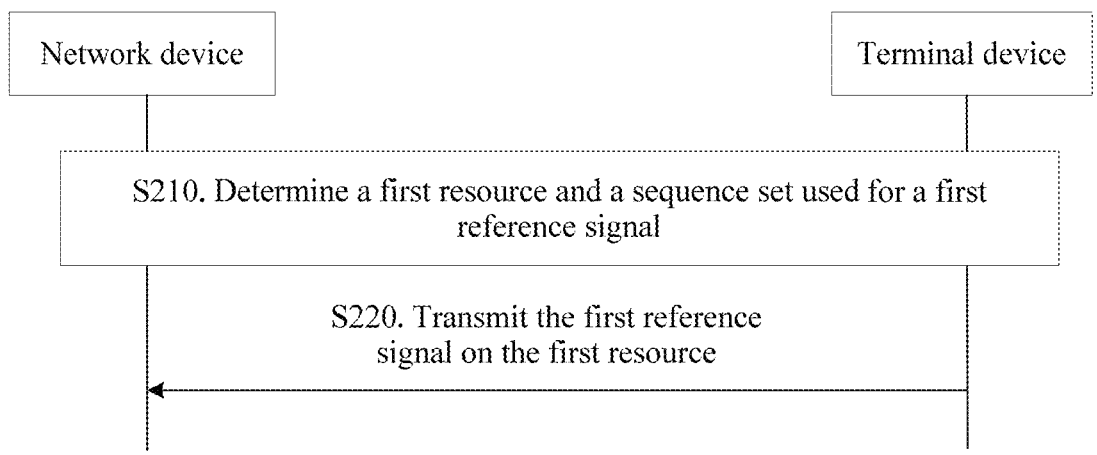
FIG. 2 is a schematic interaction diagram of a process of transmitting a reference signal according to an embodiment of the present invention.

With reference to FIG. 2, the following describes in detail a process of a method 200 for transmitting a reference signal according to an embodiment of the present invention.

In one embodiment of the present invention, a reference signal may be transmitted between a network device and a plurality of terminal devices, and a process of transmitting a reference signal between the network device and each terminal device is similar. For ease of understanding, the following uses a process of transmitting a reference signal between the network device and a terminal device (that is, a first terminal device) as an example for description.

In addition, in one embodiment of the present invention, a plurality of reference signals for a plurality of uplink channels may be transmitted between the network device and the terminal device, and a process of transmitting each reference signal is similar. For ease of understanding, the following uses a process of transmitting a reference signal (denoted as a first reference signal) for an uplink channel #A between the network device and the terminal device as an example for description.

As shown in FIG. 2, when the terminal device needs to transmit an uplink channel (for example, the uplink channel may be an uplink channel used for transmitting data and/or control information, that is, a first uplink channel) to the network device, the terminal device needs to transmit a reference signal (that is, a first reference signal) used for demodulating the uplink channel.

In S210, the terminal device may determine a resource (that is, a first resource) used for transmitting the first reference signal and sequence information of a sequence set (that is, a first sequence set) corresponding to the first reference signal.

In one embodiment of the present invention, the first resource may include a resource in time domain (denoted as a first resource in time domain) and/or a resource in frequency domain (denoted as a first resource in frequency domain).

Therefore, the terminal device may determine information used to indicate a location of the first resource in time domain (that is, time domain information of the first resource, to be specific, the first resource in time domain, denoted as information #1).

In addition, the terminal device may determine information used to indicate a location of the first resource in frequency domain (that is, frequency domain information of the first resource, to be specific, the first resource in frequency domain, denoted as information #2).

Therefore, the terminal device may determine the first resource based on the information #1 and the information #2.

In addition, in one embodiment of the present invention, the first sequence set may include Q sequences, where Q≥1, and a value of Q may be determined based on a quantity of layers of the first reference signal (or a quantity of included sub reference signals). For example, the value of Q may be the same as the quantity of layers of the first reference signal, and layer index values are 0 to Q-1.

The terminal device may determine sequence information (that is, sequence information of the first sequence set, denoted as information #3) used to indicate the first sequence set (specifically, each sequence in the first sequence set).

Therefore, the terminal device may determine the first sequence set based on the information #3.

In one embodiment of the present invention, "sequence information" may be a specific sequence included in the sequence set; or "sequence information" may be a specific sequence corresponding to a sequence included in the sequence set, or a layer index value corresponding to a specific sequence; or "sequence information" may be a cyclic shift corresponding to a sequence included in the sequence set; or "sequence information" may be a cyclic shift corresponding to a sequence included in the sequence set and a layer index value corresponding to the cyclic shift. This is not particularly limited in the present invention, provided that the terminal device can determine, based on the sequence information, each sequence included in the sequence set allocated by the network device.

As an example rather than a limitation, in one embodiment of the present invention, a communications system or a communication protocol specifies a reference sequence set (that is, a second sequence set). In addition, as an example rather than a limitation, the second sequence set includes Q sequences. Therefore, the Q sequences that the first sequence set includes may correspond to the Q sequences that the second sequence set includes. For example, a value of a cyclic shift of a sequence #i' in the first sequence set may be a value obtained by rounding up or rounding down after a value of a cyclic shift of a sequence #i in the second sequence set is divided by a preset value (for example, 2), where i∈[1, N]. The second sequence set may be predefined, or may be configured by using higher layer signaling. The preset value may be predefined, or may be configured by using higher layer signaling.

In one embodiment of the present invention, the terminal device may determine the information #1, the information #2, and the information #3 in the following manners.

Manner 1

In one embodiment of the present invention, a mapping relationship (that is, a first mapping relationship) may exist between the information #3 (that is, the sequence information of the first sequence set) and the information #1 (that is, the time domain information of the first resource), or a first mapping relationship may exist between location information of the first resource in time domain and cyclic shift information of a sequence included in the first sequence set, or a mapping relationship #A may exist between location information of the first resource in time domain and an intermediate variable that is of a sequence included in the first sequence set and that is used to calculate cyclic shift information.

Optionally, in one embodiment of the present invention, a cyclic shift (denoted as a first cyclic shift group) of a sequence included in the first sequence set corresponding to the first reference signal corresponds to an index of a time unit (that is, a time domain resource of the first resource, denoted as a time unit #A) used for transmitting the first reference signal. To be specific, sequences corresponding to different time unit indexes are different. It should be noted that, herein being different may be that cyclic shifts corresponding to the sequences are different, or may be that arrangements of cyclic shifts corresponding to the sequences are different. For example, when the index of the time unit #A is 0 (that is, the time unit #A is the first time unit in a time period), a first cyclic shift group of up to four sequences corresponding to the first reference signal transmitted in the time unit #A may be one of (0, 6, 3, 9) or (3, 9, 6, 0), or may be one of (0, 6, 3, 9) or (6, 0, 9, 3). It may be understood that, in a subset (0, 6, 3, 9) of the first cyclic shift group, 0 corresponds to a cyclic shift of a layer index 0, 6 corresponds to a cyclic shift of a layer index 1, 3 corresponds to a cyclic shift of a layer index 2, and 9 corresponds to a cyclic shift of a layer index 3. Definitions of other subsets are similar to this, and are not described again. To be specific, in this embodiment of the present invention, a cyclic shift corresponding to the uplink first reference signal scheduled in an sTTI #0 may be specified as one of (0, 6, 3, 9) or (3, 9, 6, 0). For example, a first cyclic shift group of up to two sequences corresponding to the first reference signal transmitted in the time unit #A may be one of (0, 6) or (3, 9). It may be understood that, in a subset (0, 6) of the first cyclic shift group, 0 corresponds to a cyclic shift of a layer index 0, and 6 corresponds to a cyclic shift of a layer index 1; or in a subset (3, 9) of the first cyclic shift group, 3 corresponds to a cyclic shift of a layer index 0, and 9 corresponds to a cyclic shift of a layer index 1.

Optionally, in one embodiment of the present invention, a cyclic shift (denoted as a first cyclic shift group) of a sequence included in the first sequence set corresponding to the first reference signal corresponds to an index of a time unit (denoted as a time unit #B) used for transmitting the first uplink channel. To be specific, sequences corresponding to different time unit indexes are different. It should be noted that, herein being different may be that cyclic shifts corresponding to the sequences are different, or may be that arrangements of cyclic shifts corresponding to the sequences are different. Examples are similar to those above, and are not described again herein.

Optionally, in one embodiment of the present invention, with respect to a time unit used for transmitting the first uplink channel (that is, a time unit currently scheduled for transmitting the first uplink channel, denoted as a time unit #B), a cyclic shift (denoted as a first cyclic shift group) of a sequence included in the first sequence set corresponding to the first reference signal corresponds to a time unit offset between the time unit #A and the time unit #B. To be specific, sequences corresponding to different time unit offsets are different. It should be noted that, herein being different may be that cyclic shifts corresponding to the sequences are different, or may be that arrangements of cyclic shifts corresponding to the sequences are different. For example, if the time unit offset between the time unit #A and the time unit #B is 0 (to be specific, the first uplink channel and the first reference signal are transmitted in the same time unit), the first cyclic shift group may be one of (0, 6, 3, 9) or (3, 9, 6, 0), or may be one of (0, 6) or (3, 9), or may be (6, 0) or (9, 3). For another example, if the time unit offset between the time unit #A and the time unit #B is 1 (to be specific, the time unit #A is a first time unit counting backward from the time unit #B), the first cyclic shift group may be one of (4, 10, 7, 1) or (10, 4, 1, 7), or may be one of (4, 10, 7, 1) or (7, 1, 4, 10), or may be one of (4, 10) or (7, 1), or may be (10, 4) or (1, 7). For another example, if the time unit offset between the time unit #A and the time unit #B is 2 (to be specific, the time unit #A is a second time unit counting backward from the time unit #B), the first cyclic shift group may be (8, 2, 11, 5) or (11, 5, 8, 2), or may be (8, 2, 11, 5) or (2, 8, 5, 11), or may be (8, 2) or (11, 5), or may be (2, 8) or (5, 11). For another example, if the time unit offset between the time unit #A and the time unit #B is −1 (to be specific, the time unit #A is a first time unit after the time unit #B), the first cyclic shift group may be one of (4, 10, 7, 1) or (10, 4, 1, 7), or may be one of (4, 10, 7, 1) or (7, 1, 4, 10), or may be one of (4, 10) or (7, 1), or may be (10, 4) or (1, 7).

Optionally, in one embodiment of the present invention, the time unit #A used for transmitting the first reference signal is the time unit #B. To be specific, the first reference signal and the first uplink channel are in the same time unit. A cyclic shift (denoted as a first cyclic shift group) of a sequence included in the first sequence set corresponding to the first reference signal corresponds to a symbol index of the first reference signal in the time unit #A. To be specific, different symbol indexes correspond to different sequences. It should be noted that, herein being different may be that cyclic shifts corresponding to the sequences are different, or may be that arrangements of cyclic shifts corresponding to the sequences are different. For example, when a symbol index is 0 (that is, the first symbol in the time unit #A), a first cyclic shift group of up to four sequences corresponding to the first reference signal transmitted in the symbol may be one of (0, 6, 3, 9) or (3, 9, 6, 0), or may be one of (0, 6, 3, 9) or (6, 0, 9, 3). It may be understood that, in a subset (0, 6, 3, 9) of the first cyclic shift group, 0 corresponds to a cyclic shift of a layer index 0, 6 corresponds to a cyclic shift of a layer index 1, 3 corresponds to a cyclic shift of a layer index 2, and 9 corresponds to a cyclic shift of a layer index 3. Definitions of other subsets are similar to this, and are not described again. For example, a first cyclic shift group of up to two sequences corresponding to the first reference signal transmitted in the symbol may be one of (0, 6) or (3, 9). It may be understood that, in a subset (0, 6) of the first cyclic shift group, 0 corresponds to a cyclic shift of a layer index 0, and 6 corresponds to a cyclic shift of a layer index 1; or in a subset (3, 9) of the first cyclic shift group, 3 corresponds to a cyclic shift of a layer index 0, and 9 corresponds to a cyclic shift of a layer index 1. Optionally, in this embodiment of the present invention, a cyclic shift (denoted as a first cyclic shift group) of a sequence included in the first sequence set corresponding to the first reference signal corresponds to a time unit offset between the time unit #A and the time unit #B and a symbol index of the first reference signal in the time unit #A. It may be understood that, sequences corresponding to different time unit offsets or symbol indexes in the time unit #A may be different. Alternatively, sequences corresponding to different time unit offsets may be different, that is, sequences corresponding to a same time unit offset but different symbol indexes are the same. Alternatively, sequences corresponding to different symbol indexes are different, that is, sequences corresponding to a same symbol index but different time unit offsets are the same. It should be noted that, herein being different may be that cyclic shifts corresponding to the sequences are different, or may be that arrangements of cyclic shifts corresponding to the sequences are different; herein being the same may be that cyclic shifts corresponding to the sequences are the same, or may be that arrangements of cyclic shifts corresponding to the sequences are the same and the cyclic shifts corresponding to the sequences are the same. Examples are similar to those above, and are not described again herein.

To be specific, in one embodiment of the present invention, a cyclic shift (denoted as a first cyclic shift group) of a sequence included in the first sequence set corresponding to the first reference signal may correspond to a location of a symbol for carrying the first reference signal in the time unit #A. To be specific, the network device and the terminal device can determine, based on the index of the first reference signal, the location of the symbol for carrying the first reference signal in the time unit.

It should be noted that, the time unit #A may be a time unit currently scheduled for transmitting the first uplink channel, or the time unit #A may not be a time unit currently scheduled for transmitting the first uplink channel. This is not particularly limited in the present invention. It may be understood that, when the first cyclic shift group corresponding to the first reference signal includes more than one subset, the terminal device needs to determine, based on fifth indication information, a cyclic shift corresponding to the first reference signal.

It should be noted that, the cyclic shift (0, 6, 3, 9) or the like illustrated above is merely an example, and is not limited in the present invention.

As an example rather than a limitation, the mapping relationship #A may be: the information #3 can be determined based on a function that uses the information #1 as a variable.

Optionally, in one embodiment of the present invention, the mapping relationship #A may be indicated by the following formula 1:

$$n_{cs,\lambda} = (n_{DMRS}^{(1)} + n_{DMRS,\lambda}^{(2)} + n_{PN}(n_{TU})) \bmod y \qquad \text{Formula 1}$$

$n_{cs,\lambda}$ indicates cyclic shift information of a sequence of a $\lambda^{th}$-layer sub reference signal carried in a time unit (or a time unit carrying the first reference signal) corresponding to the first resource.

$\lambda$ indicates a layer number of the sub reference signal using the cyclic shift, and $\lambda$ is an integer greater than or equal to 0.

$n_{DMRS}^{(1)}$ indicates first intermediate variable information for the cyclic shift information, and $n_{DMRS}^{(1)}$ may be configured based on higher layer signaling cyclicShift (cyclicShift) received by the terminal device.

$n_{DMRS,\lambda}^{(2)}$ indicates second intermediate variable information for the cyclic shift information of the sequence of the $\lambda^{th}$-layer sub reference signal, $n_{PN}(n_s)$ indicates third intermediate variable information for the cyclic shift information, and $n_{PN}(n_{TU})$ may be a function that uses an index (that is, $n_{TU}$) of a time unit as a variable.

$n_{TU}$ may be an index of a time unit of an uplink channel demodulated based on the first reference signal, or $n_{TU}$ may be an index of a time unit of the first reference signal.

As an example rather than a limitation, $n_{PN}(n_s)$ may be, for example, $n_{PN}(n_s)$ may be, for example, $n_{PN}(n_{TU}) = \sum_{i=0}^{7} c(8N_{symb}^{UL} \cdot n_{TU} + i) \cdot 2^i$, where $c(i)$ is a random sequence, $N_{symb}^{UL}$ is a quantity of uplink symbols in a time unit, an index of the time unit may be an index of a time unit used for transmitting a reference signal in a radio frame (or a subframe or a slot) or an index of a time unit used for transmitting information.

In addition, $n_{DMRS,\lambda}^{(2)}$ may be determined according to the following formula 2:

$$n_{DMRS,\lambda}^{(2)} = (n_{DMRS,\lambda\text{-baseline}}^{(2)} + n_{TO}) \bmod y \qquad \text{Formula 2}$$

$n_{DMRS,\lambda\text{-baseline}}^{(2)}$ is reference information used for determining the second intermediate variable information.

y is a preset value. For example, a value of y may be 6 or 12.

$n_{TO}$ indicates an offset between the time unit of the first reference signal and the time unit of the first uplink channel (uplink channel demodulated based on the first reference signal).

In addition, $n_{DMRS,\lambda\text{-baseline}}^{(2)}$ may be determined by the terminal device based on an indication in recently received physical layer indication information or configured based on higher layer signaling.

In addition, $n_{DMRS,\lambda\text{-baseline}}^{(2)}$ is a relative position predefined for a time unit, where the predefined relative position of the time unit is a position of the time unit used for transmitting the first reference signal, relative to the time unit used for transmitting the first uplink channel.

For example, the predefined relative position of the time unit is that the time unit used for transmitting the first reference signal and the time unit used for transmitting the first uplink channel are the same; or the predefined relative position of the time unit is that the time unit used for transmitting the first reference signal and the time unit used for transmitting the first uplink channel are the same and that the first reference signal is on the first symbol or the last symbol of the time unit.

The predefined relative position of the time unit may be preset or may be configured by using higher layer signaling.

For example, if the predefined relative position of the time unit is that the time unit used for transmitting the first reference signal and the time unit used for transmitting the first uplink channel are the same, a time unit offset is 0.

For another example, if a current relative position of the time unit is that the time unit used for transmitting the first reference signal is a time unit before the time unit used for transmitting the first uplink channel, a time unit offset is 1 or −1.

The time unit offset $n_{TO}$ is a time unit offset between the predefined relative position of the time unit and the current relative position of the time unit, and a sub reference signal at each layer corresponds to a same time unit offset.

Optionally, in one embodiment of the present invention, the mapping relationship #A may be indicated by the following formula 3:

$$n_{DMRS,\lambda}^{'(2)} = n_{DMRS,\lambda}^{(2)}((sTTI\ index)\bmod x) \quad (2)$$

$n_{DMRS,\lambda}^{(2)}$ indicates second intermediate variable information used for determining cyclic shift information of a sequence of $\lambda^{th}$-layer sub reference signal.

$n_{DMRS,\lambda}^{'(2)}()$ indicates second intermediate variable information for cyclic shift information of the sequence of the $\lambda^{th}$-layer sub reference signal corresponding to a time unit index $n_{TU}$, and $n_{DMRS,\lambda}^{'(2)}()$ may be preset or configured by using higher layer signaling.

The time unit index $n_{TU}$ may be an index of a time unit used for transmitting the first reference signal in a radio frame or a subframe or a slot; or the time unit index $n_{TU}$ may be an index of a time unit used for transmitting the first uplink channel in a radio frame or a subframe or a slot.

X is a positive integer greater than 0, and x may be preset or configured by using higher layer signaling. For example, x is any value in 2, 3, 4, 6, and 12.

For another example, in this embodiment of the present invention, the mapping relationship #A may be shown in the following table. It should be noted that, alternatively, index information of the time unit of the first reference signal in the following table may be information of the time unit offset between the time unit of the first reference signal and the time unit of the first uplink channel, and vice versa. This is not limited herein.

TABLE 1

| Cyclic shift of a sequence of the first reference signal (for example, a maximum quantity of layers is 4) | Index information of the time unit of the first reference signal (for example, a value of the time unit index modulo 3) |
| --- | --- |
| 0, 6, 3, 9 | 0 |
| 6, 0, 9, 3 | 1 |
| 3, 9, 6, 0 | 2 |

TABLE 2

| Cyclic shift of a sequence of the first reference signal (for example, a maximum quantity of layers is 2) | Index information of the time unit of the first reference signal (for example, a value of the time unit index modulo 3) |
| --- | --- |
| 0, 6 | 0 |
| 3, 9 | 1 |
| 6, 0 | 2 |

TABLE 3

| Cyclic shift of a sequence of the first reference signal (for example, a maximum quantity of layers is 4, and one time unit index corresponds to a plurality of cyclic shifts) | Index information of the time unit of the first reference signal (for example, a value of the time unit index modulo 3) |
| --- | --- |
| 0, 6, 3, 9 or 6, 0, 9, 3 | 0 |
| 4, 10, 7, 1 or 10, 4, 1, 7 | 1 |
| 2, 8, 5, 11 or 8, 2, 11, 5 | 2 |

It should be noted that, as shown in Table 3, in this embodiment of the present invention, a time unit (specifically, an index of a time unit) may correspond to two or more cyclic shifts. In this case, in one embodiment of the present invention, the network device may further transmit a piece of indication information (denoted as indication information #A) to the terminal device, where the indication information #A may be used to indicate which cyclic shift in a plurality of cyclic shifts corresponding to the time unit is a cyclic shift used for the first reference signal. To avoid repetition, the following omits descriptions about same or similar cases.

TABLE 4

| Cyclic shift of a sequence of the first reference signal (for example, a maximum quantity of layers is 2, and a time unit index corresponds to a plurality of cyclic shifts) | Index information of the time unit of the first reference signal (for example, a value of the time unit index modulo 3) |
| --- | --- |
| 0, 6 or 6, 0 | 0 |
| 2, 8 or 8, 2 | 1 |
| 4, 10 or 10, 4 | 2 |

TABLE 5

| Cyclic shift of a sequence of the first reference signal (for example, a maximum quantity of layers is 4) | Index information of the time unit of the first reference signal (for example, a value of the time unit index modulo 4) |
| --- | --- |
| 0, 6, 3, 9 | 0 |
| 6, 0, 9, 3 | 1 |

TABLE 5-continued

| Cyclic shift of a sequence of the first reference signal (for example, a maximum quantity of layers is 4) | Index information of the time unit of the first reference signal (for example, a value of the time unit index modulo 4) |
|---|---|
| 3, 9, 6, 0 | 2 |
| 9, 3, 0, 6 | 3 |

TABLE 6

| Cyclic shift of a sequence of the first reference signal (for example, a maximum quantity of layers is 4) | Information about the time unit offset between the time unit of the first reference signal and the time unit of the first uplink channel |
|---|---|
| 0, 6, 3, 9 | 0 |
| 2, 8, 5, 11 | 1 |
| 4, 10, 7, 1 | 2 |

TABLE 7

| Cyclic shift of a sequence of the first reference signal (for example, a maximum quantity of layers is 4) | Information about the time unit offset between the time unit of the first reference signal and the time unit of the first uplink channel |
|---|---|
| 0, 6, 3, 9 | 0 |
| 2, 8, 5, 11 | 1 |
| 4, 10, 7, 1 | 2 |
| 3, 9, 6, 0 | 3 |

TABLE 8

| Cyclic shift of a sequence of the first reference signal (for example, a maximum quantity of layers is 4) | Index information of the time unit of the first reference signal (for example, a value of the time unit index modulo 3) |
|---|---|
| 0, 6, 3, 9 | 0 |
| 6, 0, 9, 3 | 0 |
| 2, 8, 5, 11 | 1 |
| 8, 2, 11, 5 | 1 |
| 4, 10, 7, 1 | 2 |
| 10, 4, 1, 7 | 2 |

TABLE 9

| Cyclic shift of a sequence of the first reference signal (for example, a maximum quantity of layers is 2) | Index information of the time unit of the first reference signal (for example, a value of the time unit index modulo 3) |
|---|---|
| 0, 6 | 0 |
| 3, 9 | 0 |
| 2, 8, | 1 |
| 5, 11 | 1 |
| 4, 10, | 2 |
| 7, 1 | 2 |

TABLE 10

| Cyclic shift of a sequence of the first reference signal (for example, a maximum quantity of layers is 4) | Index information of the time unit of the first reference signal (for example, a value of the time unit index modulo 4) |
|---|---|
| 0, 6, 3, 9 | 0 |
| 6, 0, 9, 3 | 0 |
| 2, 8, 5, 11 | 1 |
| 8, 2, 11, 5 | 1 |
| 4, 10, 7, 1 | 2 |
| 10, 4, 1, 7 | 2 |
| 9, 3, 0, 6 | 3 |
| 3, 9, 6, 0 | 3 |

TABLE 11

| Cyclic shift of a sequence of the first reference signal (for example, a maximum quantity of layers is 2) | Index information of the time unit of the first reference signal (for example, a value of the time unit index modulo 4) |
|---|---|
| 0, 6 | 0 |
| 3, 9 | 0 |
| 2, 8 | 1 |
| 5, 11 | 1 |
| 4, 10 | 2 |
| 7, 1 | 2 |
| 9, 3 | 3 |
| 6, 0 | 3 |

TABLE 12

| Cyclic shift of a sequence of the first reference signal (for example, a maximum quantity of layers is 2) | Index information of the time unit of the first reference signal (for example, a value of the time unit index modulo 4) |
|---|---|
| 0, 6 | 0, where the first reference symbol is located, for example, in the first symbol in the time unit |
| 3, 9 | 0, where the first reference symbol is located, for example, in the last symbol in the time unit |
| 2, 8 | 1, where the first reference symbol is located, for example, in the first symbol in the time unit |
| 5, 11 | 1, where the first reference symbol is located, for example, in the last symbol in the time unit |
| 4, 10 | 2, where the first reference symbol is located, for example, in the first symbol in the time unit |
| 7, 1 | 2, where the first reference symbol is located, for example, in the last symbol in the time unit |
| 9, 3 | 3, where the first reference symbol is located, for example, in the first symbol in the time unit |
| 6, 0 | 3, where the first reference symbol is located, for example, in the last symbol in the time unit |

It should be noted that, as shown in Table 12, in one embodiment of the present invention, a time unit (specifically, an index of a time unit) may correspond to two or more cyclic shifts. In this case, in this embodiment of the present invention, a mapping relationship may exist between a plurality of symbols in a time unit and a plurality of cyclic shifts corresponding to the time unit. Therefore, the network device and the terminal device can further determine, based on the mapping relationship and a location of a symbol carrying the first reference signal in the time unit, which cyclic shift in the plurality of cyclic shifts corresponding to the time unit is a cyclic shift used for the first reference signal. To avoid repetition, the following omits descriptions about same or similar cases.

TABLE 13

| Cyclic shift of a sequence of the first reference signal | Information about a time unit offset between the time unit of the first reference signal and a time unit n of the first uplink channel |
|---|---|
| 0, 6, 3, 9 | 0, where the first reference symbol is located, for example, in the first symbol in a time unit n |
| 6, 0, 9, 3 | 0, where the first reference symbol is located, for example, in the last symbol in a time unit n |
| 2, 8, 5, 11 | 1, where the first reference symbol is located, for example, in the first symbol in a time unit n − 1 |
| 8, 2, 11, 5 | 1, where the first reference symbol is located, for example, in the last symbol in a time unit n − 1 |
| 4, 10, 7, 1 | 2, where the first reference symbol is located, for example, in the first symbol in a time unit n − 2 |
| 10, 4, 1, 7 | 2, where the first reference symbol is located, for example, in the last symbol in a time unit n − 2 |

TABLE 14

| Cyclic shift of a sequence of the first reference signal | Information about a time unit offset between the time unit of the first reference signal and a time unit n of the first uplink channel |
|---|---|
| 0, 6 | 0, where the first reference symbol is located, for example, in the first symbol in a time unit n |
| 0, 6 | 0, where the first reference symbol is located, for example, in the last symbol in a time unit n |
| 2, 8, | 1, where the first reference symbol is located, for example, in the first symbol in a time unit n − 1 |
| 2, 8, | 1, where the first reference symbol is located, for example, in the last symbol in a time unit n − 1 |
| 4, 10, | 2, where the first reference symbol is located, for example, in the first symbol in a time unit n − 2 |
| 10, 4, | 2, where the first reference symbol is located, for example, in the last symbol in a time unit n − 2 |
| 9, 3 | 3, where the first reference symbol is located, for example, in the first symbol in a time unit n + 1 |
| 0, 6 | 3, where the first reference symbol is located, for example, in a second symbol in a time unit n |

TABLE 15

| Cyclic shift of a sequence of the first reference signal | Information about a time unit offset between the time unit of the first reference signal and a time unit n of the first uplink channel |
|---|---|
| 0, 6 | 0, where the first reference symbol is located, for example, in the first symbol in a time unit n |
| 0, 6 | 0, where the first reference symbol is located, for example, in a second symbol in a time unit n |
| 0, 6 or 6, 0 | 0, where the first reference symbol is located, for example, in a third symbol in a time unit n, or the first reference symbol is located, for example, in the first symbol in a time unit n + 1 |
| 2, 8, | 1, where the first reference symbol is located in the first symbol counting backward from a time unit n |
| 4, 10, | 2, where the first reference symbol is located in the second symbol counting backward from a time unit n |
| 10, 4, | 3, where the first reference symbol is located in the third symbol counting backward from a time unit n |
| 9, 3 | 4, where the first reference symbol is located in the fourth symbol counting backward from a time unit n |
| 3, 9 | 5, where the first reference symbol is located in the fifth symbol counting backward from a time unit n |

It should be noted that, the cyclic shifts in the table are examples. For example, alternatively, (0, 6) may be (0, 6, 3, 9).

It should be noted that, a time unit offset value may be a value of a time unit offset that undergoes a modulo operation or does not undergo a modulo operation. When the time unit of the first reference signal is before the time unit of the first uplink channel, the time unit offset is a positive integer; when the time unit of the first reference signal is after the time unit of the first uplink channel, the time unit offset is a negative integer; or when the time unit of the first reference signal is the same as the time unit of the first uplink channel, the time unit offset is 0. For example, it is a value of the time unit offset modulo 3, or a value of the time unit offset modulo 4, or a value of the time unit offset modulo 6, or a value of the time unit offset modulo K, where K is a positive integer greater than 1.

It should be noted that, a time unit index value may be a value of a time unit index that undergoes a modulo operation or does not undergo a modulo operation. For example, it is a value of the time unit index value modulo 3, or a value of the time unit index value modulo 4, or a value of the time unit index value modulo 6, or a value of the time unit index value modulo L, where L is a positive integer greater than 1.

In one embodiment, the network device may transmit the information #3 (the sequence information of the first sequence set) to the terminal device. Therefore, the terminal device can determine the information #1 (the time domain information of the first resource) based on the information #3 and the mapping relationship #A (for example, any one of the foregoing Tables 1 to 13).

In this case, the first symbol of a subframe and/or the last symbol of a subframe are/is not used as a time domain resource on which the first reference signal is located. It may be understood that, the terminal device determines the information #1 based on the information #3 and the mapping relationship #A, where the information #1 does not include the first symbol of a subframe and/or the last symbol of a subframe. Because a radio frequency of the terminal device may perform power ramp at a start and an end of a subframe, transmission performance of the last symbol and the first symbol in the subframe is affected. The method may be applied to prevent an uplink reference signal from being transmitted at a start and an end of a subframe, thereby ensuring performance of the uplink reference signal.

In one embodiment, when the first time unit carrying the first reference signal includes three symbols, and the first time unit is the first time unit in a time period, the first reference signal is carried in the second symbol of the first time unit, or the first reference signal is carried in the last symbol of the first time unit. Because a radio frequency of the terminal device may perform power ramp at a start and an end of a subframe, transmission performance of the last symbol and the first symbol in the subframe is affected. The method may be applied to prevent an uplink reference signal from being transmitted at a start and an end of a subframe, thereby ensuring performance of the uplink reference signal.

In one embodiment, when the first time unit carrying the first reference signal includes three symbols, and the first time unit is the last time unit in a time period, the first reference signal is carried in the first symbol of the first time unit, or the first reference signal is carried in the second symbol of the first time unit. Because a radio frequency of the terminal device may perform power ramp at a start and an end of a subframe, transmission performance of the last symbol and the first symbol in the subframe is affected. The method may be applied to prevent an uplink reference signal from being transmitted at a start and an end of a subframe, thereby ensuring performance of the uplink reference signal.

In one embodiment, when the first time unit carrying the first reference signal includes three symbols, and the first time unit is the third time unit in a time period, the first reference signal is carried in the first symbol of the first time unit, or the first reference signal is carried in the second symbol of the first time unit. Because a radio frequency of the terminal device may perform power ramp at an end of a slot, transmission performance of the last symbol in the slot is affected. The method may be applied to prevent an uplink reference signal from being transmitted at the end of the slot, thereby ensuring performance of the uplink reference signal.

In one embodiment, a time period includes six time units.

In one embodiment, the first time unit in a time period includes three symbols, the last time unit in the time period includes three symbols, and each time unit except the first time unit and the last time unit in the time period includes two symbols.

In one embodiment, the third time unit in a time period includes three symbols, the last time unit in the time period includes three symbols, and each time unit except the third time unit and the last time unit in the time period includes two symbols.

In one embodiment, a time period is a subframe, or a time period is one millisecond (ms).

In one embodiment, the network device may transmit the information #1 to the terminal device. Therefore, the terminal device can determine the information #3 based on the information #1 and the mapping relationship #A (for example, the foregoing formula 1 or 2 or any one of Tables 1 to 13).

In one embodiment, the terminal device may determine a candidate set of the information #1 based on a duration corresponding to the time unit used for transmitting the first uplink channel or the time unit index of the time unit used for transmitting the first uplink channel; or the terminal device may determine the mapping relationship #A based on a duration corresponding to the time unit used for transmitting the first uplink channel or the time unit index of the time unit used for transmitting the first uplink channel. Because a duration of a time unit in a time period is variable, only one mapping relationship or candidate set causes reduction of flexibility of the uplink reference signal. The solution may be applied to cause the mapping relationship between the sequence information of the first sequence set and the time domain information of the first resource or a candidate location of the time domain information of the first resource to change with the time unit of the first uplink channel, thereby improving flexibility of indicating the time domain information.

In one embodiment, the terminal device may determine the information #1 based on second indication information and the candidate set of the information #1, or the terminal device may determine the information #1 based on the information #3 and the mapping relationship #A, or the terminal device may determine the information #1 based on the information #3, the candidate set of the information #1, and the mapping relationship #A.

It should be noted that, in this embodiment of the present invention, time unit index information of a same first reference signal (or same time unit offset information) may correspond to information of a plurality of cyclic shifts (for example, cyclic shifts of at least two subsets). In this embodiment of the present invention, time unit index information of a same uplink channel may correspond to information of a plurality of cyclic shifts (for example, cyclic shifts of at least two subsets).

In one embodiment, mapping relationships #A corresponding to time unit index information of different first uplink channels are different, or mapping relationships #A corresponding to time unit index information of different first reference signals are different. Being different means that at least one of information #1 and information #3 in the mapping relationships #A is different, or that at least one parameter corresponding to a same parameter set index is different.

In one embodiment, candidate time domain information sets of first resources corresponding to time unit index information of different first uplink channels are different, or candidate time domain information sets corresponding to time unit index information of different first reference signals are different. Being different means that at least one candidate time domain resource in different candidate time domain information sets is different, or that at least one parameter corresponding to a same parameter set index is different.

It should be noted that, alternatively, the index information of the time unit of the first reference signal in each table in this embodiment of the present invention may be index information of the time unit of the first uplink channel. To avoid repetition, the following omits descriptions about same or similar cases.

Optionally, in one embodiment of the present invention, the information #1 (that is, the location of the time domain information) may correspond to information of more than one cyclic shift (that is, sequence information, for example, a cyclic shift #1 and a cyclic shift #2), where the information of each cyclic shift may be a cyclic shift corresponding to one sequence, or may be a cyclic shift corresponding to a plurality of sequences, or a cyclic shift of a plurality of layers of sequences, or a cyclic shift of sequences of a plurality of subsets.

In this case, for example, the network device may further transmit, to the terminal device, fifth indication information used to indicate whether the information #3 is the cyclic shift #1 or the cyclic shift #2. As an example rather than a limitation, the fifth indication information may include, for example, one bit or two bits.

Therefore, the terminal device can determine the information #3 based on the fifth indication information, the information #1, and the mapping relationship #A.

It should be noted that, in one embodiment of the present invention, information of the mapping relationship #A (for example, the foregoing formula 1 or 2 or any one of Tables 1 to 13) may be stored in the network device and the terminal device.

As an example rather than a limitation, in one embodiment of the present invention, the information of the mapping relationship #A may be pre-specified by the communications system or the communication protocol, that is, set by a user, an operator, or a manufacturer in the network device or the terminal device, or the mapping relationship #A may be transmitted by the network device to the terminal device by using higher layer signaling, or the mapping relationship #A may be transmitted by the network device to the terminal device by using physical layer signaling, or the mapping relationship #A may be determined by the terminal device based on the duration corresponding to the time unit used for transmitting the first uplink channel or the time unit index of the time unit used for transmitting the first uplink channel. This is not particularly limited in the present invention, as long as it is ensured that the information of the mapping relationship #A stored in the network device corresponds to (for example, is the same as) that stored in the terminal device.

It should be understood that, a specific form of the information #1 described in the foregoing formula 1 or 2 or any one of Tables 1 to 15 illustrated above is only time domain information in this embodiment of the present invention. However, the present invention is not limited thereto. Based on a required form of time domain information, the user may change the specific form of the information #1 described in the foregoing formula 1 or 2 or any one of Tables 1 to 15. For example, the specific form of the information #1 may be a form corresponding to any one of the foregoing meanings 1 to 3. Specifically, the information #1 may indicate the index of the time unit #A (specifically, a location of the time unit #A in a time period to which the time unit #A belongs), or the information #1 may indicate the time unit offset between the time unit #A and the time unit #B, or the information #1 may indicate a location of a symbol used for transmitting the first reference signal in the time unit #A.

In addition, a specific form of the information #3 described in the foregoing formula 1 or 2 or any one of Tables 1 to 15 illustrated above is only sequence information in this embodiment of the present invention. However, the present invention is not limited thereto. Based on a required form of sequence information, the user may change the specific form of the information #3 described in the foregoing formula 1 or 2 or any one of Tables 1 to 15. For example, the specific form of the information #3 may be a cyclic shift, or a sequence itself, or may be an intermediate variable used to calculate a cyclic shift.

Manner 2

In one embodiment of the present invention, a mapping relationship #B (that is, another example of the first mapping relationship) may exist between the information #3 (that is, the sequence information of the first sequence set) and the information #2 (that is, the frequency domain information of the first resource), or a mapping relationship #B may exist between location information of the first resource in frequency domain and cyclic shift information of a sequence included in the first sequence set, or a mapping relationship #B may exist between location information of the first resource in frequency domain and an intermediate variable that is of a sequence included in the first sequence set and that is used to calculate cyclic shift information.

It should be noted that, in one embodiment of the present invention, the information #2 may specifically include the location information of the first resource in frequency domain when a frequency division multiplexing (for example, IFDMA) mode is used. For example, the information #2 may be used to indicate a pattern corresponding to the first resource in the foregoing pattern 1 and pattern 2. It should be understood that, specific content indicated by the information #2 illustrated above is merely an example for description. However, the present invention is not limited thereto. For example, the information #2 may further include the location information of the first resource in frequency domain when a non frequency division multiplexing (for example, CDM) mode is used.

Optionally, in one embodiment of the present invention, a cyclic shift (denoted as a first cyclic shift group) of a sequence included in the first sequence set corresponds to an index of at least one frequency domain pattern (that is, a frequency domain resource of the first resource, for example, at least one of a plurality of frequency domain patterns corresponding to the IFDMA mode, denoted as a pattern 1, or a pattern 1 and a pattern 2) used for transmitting the first reference signal. For example, when the first cyclic shift group used for the first reference signal is (0, 6, 3, 9), an index of the pattern 1 used when the first reference signal is transmitted may be 0 (for example, an index value of a pattern corresponding to an odd subcarrier). To be specific, in this embodiment of the present invention, the cyclic shift used for the uplink reference signal scheduled on the pattern corresponding to the odd subcarrier may be specified as (0, 6, 3, 9). For example, when the first cyclic shift group used for the first reference signal is (0, 6, 3, 9), the index of the pattern 1 used when the first reference signal is transmitted may be 0 and 1 (for example, an index value of a pattern corresponding to an even subcarrier), that is, sub reference signals at layers #0 and #1 corresponding to 0, and sub reference signals at layers #2 and #3 corresponding to 1, which may be understood as cyclic shifts of sequences of the sub reference signals at the layers #0 and #1 corresponding to 0, and cyclic shifts of sequences of the sub reference signals at the layers #2 and #3 corresponding to 1, or may be understood as intermediate variables used to calculate cyclic shifts of sequences of the sub reference signals at the layers #0 and #1 corresponding to 0, and intermediate variables used to calculate cyclic shifts of sequences of the sub reference signals at the layers #2 and #3 corresponding to 1, where 0 to 3 at the layer #0 to the layer #3 are layer index values.

As an example rather than a limitation, in this embodiment of the present invention, the pattern 1 may be a pattern currently scheduled for transmitting the first uplink channel.

Optionally, the mapping relationship #B may be: the information #2 can be determined based on a function that uses the information #3 as a variable.

Alternatively, assuming that the first reference signal includes four layers (the layer #0 to the layer #3), or assuming that the first reference signal includes four layers of sub reference signals, the mapping relationship #B may be shown in the following tables.

TABLE 16

| Cyclic shift of a sequence of the first reference signal | | | | Frequency domain pattern of the first reference signal | | | |
| --- | --- | --- | --- | --- | --- | --- | --- |
| Layer #0 | Layer #1 | Layer #2 | Layer #3 | Layer #0 | Layer #1 | Layer #2 | Layer #3 |
| 0 | 6 | 3 | 9 | Pattern 1 | Pattern 1 | Pattern 1 | Pattern 1 |
| 6 | 0 | 9 | 3 | Pattern 2 | Pattern 2 | Pattern 2 | Pattern 2 |
| 3 | 9 | 6 | 0 | Pattern 2 | Pattern 2 | Pattern 2 | Pattern 2 |
| 4 | 10 | 7 | 1 | Pattern 1 | Pattern 1 | Pattern 1 | Pattern 1 |
| 2 | 8 | 5 | 11 | Pattern 1 | Pattern 1 | Pattern 1 | Pattern 1 |
| 8 | 2 | 11 | 5 | Pattern 2 | Pattern 2 | Pattern 2 | Pattern 2 |
| 10 | 4 | 1 | 7 | Pattern 2 | Pattern 2 | Pattern 2 | Pattern 2 |
| 9 | 3 | 0 | 6 | Pattern 1 | Pattern 1 | Pattern 1 | Pattern 1 |

TABLE 17

| Cyclic shift of a sequence of the first reference signal | | | | Frequency domain pattern of the first reference signal | | | |
|---|---|---|---|---|---|---|---|
| Layer #0 | Layer #1 | Layer #2 | Layer #3 | Layer #0 | Layer #1 | Layer #2 | Layer #3 |
| 0 | 6 | 3 | 9 | Pattern 1 | Pattern 1 | Pattern 2 | Pattern 2 |
| 6 | 0 | 9 | 3 | Pattern 2 | Pattern 2 | Pattern 1 | Pattern 1 |
| 3 | 9 | 6 | 0 | Pattern 2 | Pattern 2 | Pattern 1 | Pattern 1 |
| 4 | 10 | 7 | 1 | Pattern 2 | Pattern 2 | Pattern 2 | Pattern 2 |
| 2 | 8 | 5 | 11 | Pattern 2 | Pattern 2 | Pattern 2 | Pattern 2 |
| 8 | 2 | 11 | 5 | Pattern 1 | Pattern 1 | Pattern 1 | Pattern 1 |
| 10 | 4 | 1 | 7 | Pattern 1 | Pattern 1 | Pattern 1 | Pattern 1 |
| 9 | 3 | 0 | 6 | Pattern 2 | Pattern 2 | Pattern 1 | Pattern 1 |

TABLE 18

| Cyclic shift of a sequence of the first reference signal | | | | Frequency domain pattern of the first reference signal | | | |
|---|---|---|---|---|---|---|---|
| Layer #0 | Layer #1 | Layer #2 | Layer #3 | Layer #0 | Layer #1 | Layer #2 | Layer #3 |
| 0 | 6 | 3 | 9 | Pattern 1 | Pattern 2 | Pattern 3 | Pattern 4 |
| 6 | 0 | 9 | 3 | Pattern 3 | Pattern 4 | Pattern 1 | Pattern 2 |
| 3 | 9 | 6 | 0 | Pattern 3 | Pattern 4 | Pattern 1 | Pattern 2 |
| 4 | 10 | 7 | 1 | Pattern 1 | Pattern 2 | Pattern 1 | Pattern 2 |
| 2 | 8 | 5 | 11 | Pattern 1 | Pattern 2 | Pattern 1 | Pattern 2 |
| 8 | 2 | 11 | 5 | Pattern 3 | Pattern 4 | Pattern 3 | Pattern 4 |
| 10 | 4 | 1 | 7 | Pattern 3 | Pattern 4 | Pattern 3 | Pattern 4 |
| 9 | 3 | 0 | 6 | Pattern 1 | Pattern 2 | Pattern 3 | Pattern 4 |

As an example rather than a limitation, in one embodiment of the present invention, frequency domain patterns corresponding to different layers of the same reference signal (or different sub reference signals of the same reference signal) may be the same, for example, as shown in the foregoing Table 14.

Alternatively, in one embodiment of the present invention, frequency domain patterns corresponding to different layers of the same reference signal (or different sub reference signals of the same reference signal) may be different, for example, as shown in the foregoing Table 15 or Table 16.

Therefore, the network device may transmit the information #3 to the terminal device. Therefore, the terminal device can determine the information #2 based on the information #3 and the mapping relationship #B (for example, the foregoing Table 14 or Table 15 or Table 16).

It should be noted that, in this embodiment of the present invention, information of the mapping relationship #B (for example, the foregoing Table 15 or Table 16) may be stored in the network device and the terminal device.

As an example rather than a limitation, in one embodiment of the present invention, the information of the mapping relationship #B may be specified by the communications system or the communication protocol, or the mapping relationship #B may be determined and delivered by the network device to the terminal device, or the mapping relationship #B may be set by a user, an operator, or a manufacturer in the network device or the terminal device. This is not particularly limited in the present invention, as long as it is ensured that the information of the mapping relationship #B stored in the network device corresponds to (for example, is the same as) that stored in the terminal device.

It should be understood that, a specific form of the information #2 described in the foregoing Table 14 or Table 15 or Table 16 illustrated above is only frequency domain information in this embodiment of the present invention. However, the present invention is not limited thereto. Based on a required form of frequency domain information, the user may change the specific form of the information #2 described in the foregoing Table 14 or Table 15 or Table 16. For example, the specific form of the information #2 may be a frequency domain pattern corresponding to the IFDMA mode, or the specific form of the information #2 may be a frequency domain pattern corresponding to the CDM mode.

In addition, a specific form of the information #3 described in the foregoing Table 15 or Table 16 illustrated above is only sequence information in this embodiment of the present invention. However, the present invention is not limited thereto. Based on a required form of sequence information, the user may change the specific form of the information #3 described in the foregoing Table 14 or Table 15 or Table 16. For example, the specific form of the information #3 may be a cyclic shift, or a sequence itself.

Manner 3

In one embodiment of the present invention, the network device and the terminal device may store N parameter sets, where each of the N parameter sets includes two (or more than two) parameters.

As an example rather than a limitation, optionally, in a manner 3-A, each of the N parameter sets includes at least two parameters, where at least one parameter corresponds to sequence information, and at least one parameter corresponds to time domain information.

In this case, in one embodiment of the present invention, the N parameter sets may be shown in the following tables.

TABLE 19

| Set index | Cyclic shift of a sequence of the first reference signal | Index information of the time unit of the first reference signal (for example, a value of the time unit index modulo 3) |
|---|---|---|
| 000 | 0, 6, 3, 9 | 0 |
| 001 | 6, 0, 9, 3 | 0 |
| 010 | 2, 8, 5, 11 | 1 |
| 011 | 8, 2, 11, 5 | 1 |
| 100 | 4, 10, 7, 1 | 2 |
| 101 | 10, 4, 1, 7 | 2 |

TABLE 20

| Set index | Cyclic shift of a sequence of the first reference signal | Index information of the time unit of the first reference signal (for example, a value of the time unit index modulo 3) |
|---|---|---|
| 000 | 0, 6 | 0 |
| 001 | 3, 9 | 0 |
| 010 | 2, 8, | 1 |
| 011 | 5, 11 | 1 |
| 100 | 4, 10, | 2 |
| 101 | 7, 1 | 2 |

TABLE 21

| Set index | Cyclic shift of a sequence of the first reference signal | Index information of the time unit of the first reference signal (for example, a value of the time unit index modulo 4) |
|---|---|---|
| 000 | 0, 6, 3, 9 | 0 |
| 001 | 6, 0, 9, 3 | 0 |
| 010 | 2, 8, 5, 11 | 1 |
| 011 | 8, 2, 11, 5 | 1 |
| 100 | 4, 10, 7, 1 | 2 |
| 101 | 10, 4, 1, 7 | 2 |
| 110 | 9, 3, 0, 6 | 3 |
| 111 | 3, 9, 6, 0 | 3 |

TABLE 22

| Set index | Cyclic shift of a sequence of the first reference signal | Index information of the time unit of the first reference signal (for example, a value of the time unit index modulo 4) |
|---|---|---|
| 000 | 0, 6 | 0 |
| 001 | 3, 9 | 0 |
| 010 | 2, 8 | 1 |
| 011 | 5, 11 | 1 |
| 100 | 4, 10 | 2 |
| 101 | 7, 1 | 2 |
| 110 | 9, 3 | 3 |
| 111 | 6, 0 | 3 |

TABLE 23

| Set index | Cyclic shift of a sequence of the first reference signal | Information about the time unit offset between the time unit of the first reference signal and the time unit of the first uplink channel (for example, a value of the time unit offset modulo 3) |
|---|---|---|
| 000 | 0, 6, 3, 9 | 0 |
| 001 | 6, 0, 9, 3 | 0 |
| 011 | 4, 10, 7, 1 | 2 |
| 100 | 2, 8, 5, 11 | 1 |
| 101 | 8, 2, 11, 5 | 1 |
| 110 | 10, 4, 1, 7 | 2 |

TABLE 24

| Set index | Cyclic shift of a sequence of the first reference signal | Information about the time unit offset between the time unit of the first reference signal and the time unit of the first uplink channel (for example, a value of the time unit offset modulo 4) |
|---|---|---|
| 000 | 0, 6, 3, 9 | 0 |
| 001 | 6, 0, 9, 3 | 0 |
| 010 | 3, 9, 6, 0 | 3 |
| 011 | 4, 10, 7, 1 | 2 |
| 100 | 2, 8, 5, 11 | 1 |
| 101 | 8, 2, 11, 5 | 1 |
| 110 | 10, 4, 1, 7 | 2 |
| 111 | 9, 3, 0, 6 | 3 |

In one embodiment, in a manner 3-B, each of the N parameter sets includes at least two parameters, where one parameter corresponds to sequence information, and another parameter corresponds to frequency domain information.

In this case, in one embodiment of the present invention, the N parameter sets may be shown in the following tables.

TABLE 25

| Set index | Cyclic shift of a sequence of the first reference signal | | | | Frequency domain pattern of the first reference signal | | | |
|---|---|---|---|---|---|---|---|---|
| | Layer #0 | Layer #1 | Layer #2 | Layer #3 | Layer #0 | Layer #1 | Layer #2 | Layer #3 |
| 000 | 0 | 6 | 3 | 9 | Pattern 1 | Pattern 1 | Pattern 1 | Pattern 1 |
| 001 | 6 | 0 | 9 | 3 | Pattern 2 | Pattern 2 | Pattern 2 | Pattern 2 |
| 010 | 3 | 9 | 6 | 0 | Pattern 2 | Pattern 2 | Pattern 2 | Pattern 2 |
| 011 | 4 | 10 | 7 | 1 | Pattern 1 | Pattern 1 | Pattern 1 | Pattern 1 |
| 100 | 2 | 8 | 5 | 11 | Pattern 1 | Pattern 1 | Pattern 1 | Pattern 1 |

TABLE 25-continued

| | Cyclic shift of a sequence of the first reference signal | | | | Frequency domain pattern of the first reference signal | | | |
|---|---|---|---|---|---|---|---|---|
| Set index | Layer #0 | Layer #1 | Layer #2 | Layer #3 | Layer #0 | Layer #1 | Layer #2 | Layer #3 |
| 101 | 8 | 2 | 11 | 5 | Pattern 2 | Pattern 2 | Pattern 2 | Pattern 2 |
| 110 | 10 | 4 | 1 | 7 | Pattern 2 | Pattern 2 | Pattern 2 | Pattern 2 |
| 111 | 9 | 3 | 0 | 6 | Pattern 1 | Pattern 1 | Pattern 1 | Pattern 1 |

TABLE 26

| | Cyclic shift of a sequence of the first reference signal | | | | Frequency domain pattern of the first reference signal | | | |
|---|---|---|---|---|---|---|---|---|
| Set index | Layer #0 | Layer #1 | Layer #2 | Layer #3 | Layer #0 | Layer #1 | Layer #2 | Layer #3 |
| 000 | 0 | 6 | 3 | 9 | Pattern 1 | Pattern 1 | Pattern 2 | Pattern 2 |
| 001 | 6 | 0 | 9 | 3 | Pattern 2 | Pattern 2 | Pattern 1 | Pattern 1 |
| 010 | 3 | 9 | 6 | 0 | Pattern 2 | Pattern 2 | Pattern 1 | Pattern 1 |
| 011 | 4 | 10 | 7 | 1 | Pattern 2 | Pattern 2 | Pattern 2 | Pattern 2 |
| 100 | 2 | 8 | 5 | 11 | Pattern 2 | Pattern 2 | Pattern 2 | Pattern 2 |
| 101 | 8 | 2 | 11 | 5 | Pattern 1 | Pattern 1 | Pattern 1 | Pattern 1 |
| 110 | 10 | 4 | 1 | 7 | Pattern 1 | Pattern 1 | Pattern 1 | Pattern 1 |
| 111 | 9 | 3 | 0 | 6 | Pattern 2 | Pattern 2 | Pattern 1 | Pattern 1 |

In one embodiment, in a manner 3-C, each of the N parameter sets includes at least three parameters, where one parameter corresponds to sequence information, another parameter corresponds to time domain information, and still another parameter corresponds to frequency domain information.

In this case, in one embodiment of the present invention, the N parameter sets may be shown in the following tables.

TABLE 27

| | Cyclic shift of a sequence of the first reference signal | | | | Information about the time unit offset between the time unit of the first reference signal and the time unit of the first uplink channel (for example, a value of the time unit offset modulo 4) | Index of a frequency domain pattern of the first reference signal |
|---|---|---|---|---|---|---|
| Set index | Layer #0 | Layer #1 | Layer #2 | Layer #3 | | |
| 000 | 0 | 6 | 3 | 9 | 0 | 0 (for example, an index of the pattern 1) |
| 001 | 6 | 0 | 9 | 3 | 0 | 1 (for example, an index of the pattern 2) |
| 010 | 3 | 9 | 6 | 0 | 3 | 0 |
| 011 | 4 | 10 | 7 | 1 | 2 | 0 |
| 100 | 2 | 8 | 5 | 11 | 1 | 0 |
| 101 | 8 | 2 | 11 | 5 | 1 | 1 |
| 110 | 10 | 4 | 1 | 7 | 2 | 1 |
| 111 | 9 | 3 | 0 | 6 | 3 | 1 |

TABLE 28

| | Cyclic shift of a sequence of the first reference signal | | | | Information about the time unit offset between the time unit of the first reference signal and the time unit of the first uplink channel (for example, a value of the time unit offset modulo 4) | Index of a frequency domain pattern of the first reference signal |
|---|---|---|---|---|---|---|
| Set index | Layer #0 | Layer #1 | Layer #2 | Layer #3 | | |
| 000 | 0 | 6 | 3 | 9 | 0 | 0 (for example, an index of the pattern 1) |
| 001 | 6 | 0 | 9 | 3 | 0 | 1 (for example, an index of the pattern 2) |
| 010 | 3 | 9 | 6 | 0 | 3 | 2 (for example, an index of the pattern 3) |
| 011 | 4 | 10 | 7 | 1 | 2 | 0 |
| 100 | 2 | 8 | 5 | 11 | 1 | 3 (for example, an index of the pattern 4) |
| 101 | 8 | 2 | 11 | 5 | 1 | 2 |
| 110 | 10 | 4 | 1 | 7 | 2 | 1 |
| 111 | 9 | 3 | 0 | 6 | 3 | 3 |

TABLE 29

| Set index | Cyclic shift of a sequence of the first reference signal | | | | Information about the time unit offset between the time unit of the first reference signal and the time unit of the first uplink channel (for example, a value of the time unit offset modulo 4) | Frequency domain pattern of the first reference signal | | | |
|---|---|---|---|---|---|---|---|---|---|
| | Layer #0 | Layer #1 | Layer #2 | Layer #3 | | Layer #0 | Layer #1 | Layer #0 | Layer #1 |
| 000 | 0 | 6 | 3 | 9 | 0 | Pattern 1 | Pattern 1 | Pattern 1 | Pattern 1 |
| 001 | 6 | 0 | 9 | 3 | 0 | Pattern 1 | Pattern 1 | Pattern 2 | Pattern 2 |
| 010 | 3 | 9 | 6 | 0 | 3 | Pattern 2 | Pattern 2 | Pattern 1 | Pattern 1 |
| 011 | 4 | 10 | 7 | 1 | 2 | Pattern 2 | Pattern 2 | Pattern 2 | Pattern 2 |
| 100 | 2 | 8 | 5 | 11 | 1 | Pattern 1 | Pattern 3 | Pattern 3 | Pattern 4 |
| 101 | 8 | 2 | 11 | 5 | 1 | Pattern 1 | Pattern 4 | Pattern 2 | Pattern 3 |
| 110 | 10 | 4 | 1 | 7 | 2 | Pattern 2 | Pattern 3 | Pattern 1 | Pattern 4 |
| 111 | 9 | 3 | 0 | 6 | 3 | Pattern 3 | Pattern 3 | Pattern 4 | Pattern 4 |

TABLE 30

| | Code division multiplexing mode | | Frequency division multiplexing mode | | |
|---|---|---|---|---|---|
| Set index | Time domain information of the first resource (for example, the first uplink channel is in an sTTI #n) | Cyclic shift | Time domain information of the first resource (for example, the first uplink channel is in an sTTI #n) | Pattern | Cyclic shift |
| 000 | sTTI #n, first symbol | [0, 6, 3, 9] | sTTI #n, first symbol | Pattern 1 | [0, 6] |
| 001 | sTTI #n, first symbol | [6, 0, 9, 3] | sTTI #n, first symbol | Pattern 2 | [0, 6] |
| 010 | sTTI #n, last symbol | [3, 9, 6, 0] | sTTI #n, last symbol | Pattern 1 | [6, 0] |
| 011 | sTTI #n, last symbol | [9, 3, 0, 6] | sTTI #n, last symbol | Pattern 2 | [6, 0] |
| 100 | sTTI #n − 1, first symbol | [4, 10, 7, 1] | sTTI #n − 1, first symbol | Pattern 1 | [4, 10] |
| 101 | sTTI #n − 1, last symbol | [10, 4, 1, 7] | sTTI #n − 1, last symbol | Pattern 1 | [10, 4] |
| 110 | sTTI #n − 2, first symbol | [2, 8, 5, 11] | sTTI #n − 2, first symbol | Pattern 1 | [3, 9] |
| 111 | sTTI #n − 2, last symbol | [8, 2, 11, 5] | sTTI #n − 2, last symbol | Pattern 1 | [9, 3] |

TABLE 31

| | Code division multiplexing mode | | Frequency division multiplexing mode | | |
|---|---|---|---|---|---|
| Set index | Time domain information of the first resource (for example, the first uplink channel is in an sTTI #n) | Cyclic shift | Time domain information of the first resource (for example, the first uplink channel is in an sTTI #n) | Pattern | Cyclic shift |
| 000 | sTTI #n, first symbol | [0, 6, 3, 9] | sTTI #n, first symbol | Pattern 1 | [0, 6] |
| 001 | sTTI #n, first symbol | [6, 0, 9, 3] | sTTI #n, second symbol | Pattern 2 | [0, 6] |
| 010 | sTTI #n, last symbol | [3, 9, 6, 0] | sTTI #n, last symbol | Pattern 1 | [6, 0] |

TABLE 31-continued

| | Code division multiplexing mode | | Frequency division multiplexing mode | | |
| --- | --- | --- | --- | --- | --- |
| Set index | Time domain information of the first resource (for example, the first uplink channel is in an sTTI #n) | Cyclic shift | Time domain information of the first resource (for example, the first uplink channel is in an sTTI #n) | Pattern | Cyclic shift |
| 011 | sTTI #n, last symbol | [4, 10, 7, 1] | sTTI #n, last symbol | Pattern 2 | [6, 0] |
| 100 | sTTI #n − 1, first symbol | [2, 8, 5, 11] | sTTI #n − 1, first symbol | Pattern 1 | [4, 10] |
| 101 | sTTI #n − 1, last symbol | [8, 2, 11, 5] | sTTI #n − 1, last symbol | Pattern 1 | [10, 4] |
| 110 | sTTI #n − 2, first symbol | [10, 4, 1, 7] | sTTI #n − 2, first symbol | Pattern 1 | [3, 9] |
| 111 | sTTI #n − 2, last symbol | [9, 3, 0, 6] | sTTI #n − 2, last symbol | Pattern 1 | [9, 3] |

A parameter in this embodiment may be a corresponding index value, or may be several corresponding sub parameters, for example, cyclic shifts of several sequences. This is not limited in this embodiment.

In one embodiment of the present invention, that sequence information included in two parameter sets is different may include: orders of sequences indicated by the sequence information included in the two parameter sets are different. For example, if sequence information in a parameter set #X is different from sequence information in a parameter set #Y, a sequence indicated by the sequence information included in the parameter set #X may be 0, 6, 3, 9, and a sequence indicated by the sequence information included in the parameter set #Y may be 3, 9, 0, 6.

Alternatively, that sequence information included in two parameter sets is different may include: sequences indicated by the sequence information included in the two parameter sets are different. For example, if sequence information in a parameter set #X is different from sequence information in a parameter set #Y, a sequence indicated by the sequence information included in the parameter set #X may be 0, 6, 3, 9, and a sequence indicated by the sequence information included in the parameter set #Y may be 2, 5, 8, 10.

As an example rather than a limitation, in one embodiment of the present invention, information of the N parameter sets may be specified by the communications system or the communication protocol, that is, set by a user, an operator, or a manufacturer in the network device or the terminal device, or the N parameter sets may be transmitted by the network device to the terminal device by using higher layer signaling, or the N parameter sets may be transmitted by the network device to the terminal device by using physical layer signaling. This is not particularly limited in the present invention, as long as it is ensured that the information of the N parameter sets stored in the network device corresponds to (for example, is the same as) that stored in the terminal device.

As an example rather than a limitation, in one embodiment of the present invention, the N parameter sets may be stored in forms of entries in the network device and the terminal device. For example, the N parameter sets may correspond to N rows in the entries, and each row includes two (or more than two) parameters, where one parameter corresponds to time domain information, and another parameter corresponds to frequency domain information. For another example, the N parameter sets #1 may correspond to N columns in the entries, and each column includes two (or more than two) parameters, where one parameter corresponds to time domain information, and another parameter corresponds to frequency domain information.

Therefore, the network device can select, from the N parameter sets, a parameter set (that is, a first parameter set, denoted as a parameter set #A) used for transmitting the first reference signal. In addition, the network device may transmit an index of the first parameter set to the terminal device. Therefore, the terminal device can determine the first parameter set based on the index of the first parameter set, and use parameters in the first parameter set as the information about the first resource (for example, the time domain information of the first resource and/or the frequency domain information of the first resource), and the sequence information of the first sequence set.

It should be understood that, the manner 1 to the manner 3 illustrated above may be used separately or may be used in combination. This is not particularly limited in the present invention. For example, in this embodiment of the present invention, the mapping relationship #A may be: the information #3 and the information #1 belong to a same parameter set in the N parameter sets. In this case, the network device may transmit the information #3 to the terminal device, the terminal device may determine, from the N parameter sets, the parameter set to which the information #3 belongs to, and the terminal device may use time domain information in the same parameter set as the information #1. Alternatively, the network device may transmit the information #1 to the terminal device, the terminal device may determine, from the N parameter sets, the parameter set to which the information #1 belongs to, and the terminal device may use sequence information in the same parameter set as the information #3.

For another example, in one embodiment of the present invention, the mapping relationship #B may be: the information #3 and the information #2 belong to a same parameter set in the N parameter sets. In this case, the network device may transmit the information #3 to the terminal device, the terminal device may determine, from the N parameter sets, the parameter set to which the information #3 belongs to, and the terminal device may use frequency domain information in the same parameter set as the information #2.

It should be noted that, as described above, in this embodiment of the present invention, two modes (for example, the CDM mode and the IFDMA mode) of using the frequency domain resource may exist. Therefore, in this embodiment of the present invention, the network device may further transmit, to the terminal device, information (that is, the fourth indication information) used to indicate the frequency domain use mode of the first resource. Therefore, the terminal device can uniquely determine the frequency domain use mode of the first resource based on the fourth indication information. In addition, when the frequency domain use mode of the first resource is the IFDMA mode, the terminal device can determine, in any one of the foregoing manners 1 to 3, the frequency domain pattern corresponding to the first resource.

In conclusion, in one embodiment of the present invention, a plurality of (for example, N) parameter sets may be preconfigured, where each parameter set may include at least one piece of time domain information, at least one piece of frequency domain information, and at least one piece of sequence information.

The time domain information may indicate a time domain location of the reference signal. The time domain location may include a time unit offset between a time unit carrying the first reference signal and a time unit carrying the first uplink channel, or the time domain location may include a time unit index of a time unit carrying the first reference signal, or the time domain location may include an index of a symbol carrying the first reference signal, or the time domain location may include an index of a symbol carrying the first reference signal and a time unit offset, or the time frequency location may include an index of a symbol carrying the first reference signal and a time unit index.

The frequency domain information may indicate a frequency domain pattern of the reference signal. Specifically, when a frequency domain pattern of the frequency domain resource is used in the frequency division multiplexing mode, the frequency domain pattern may include more than one pattern. In this embodiment of the present invention, when a frequency domain pattern of the code division multiplexing mode is used, the frequency domain pattern may include only one pattern.

In one embodiment, for a same parameter set, a quantity of sequences corresponding to the code division multiplexing mode is greater than a quantity of sequences corresponding to the frequency division multiplexing mode, or a quantity of layers of sub reference signals corresponding to the code division multiplexing mode is greater than a quantity of layers of sub reference signals corresponding to the frequency division multiplexing mode. This is because a quantity of users supported by the frequency division multiplexing mode may increase with a quantity of patterns of the frequency division multiplexing mode. Therefore, a total quantity of users or a total quantity of layers that may be supported by the two modes is the same. This helps reduce complexity of system allocation.

It should be noted that, in this case, as an example rather than a limitation, the network device may further indicate, to the terminal device by using, for example, one bit, whether the frequency domain resource carrying the first reference signal is in the frequency division multiplexing mode.

The frequency domain information may indicate a cyclic shift of a used sequence.

For example, in this embodiment of the present invention, at least one parameter (that is, at least one parameter in the time domain information, the frequency domain information, and the sequence information) is different between any two parameter sets (corresponding to a same resource multiplexing mode) in the N parameter sets.

Therefore, in one embodiment of the present invention, for example, the network device may determine a parameter set (hereinafter for ease of understanding and distinguishing, denoted as a parameter set #3) to which the time domain information, the frequency domain information, and the sequence information (that is, the information #1 to the information #3) of the first reference signal belong. In addition, the network device may transmit indication information of the parameter set #3 to the terminal device. Therefore, the terminal device can determine the parameter set #3, and use the time domain information, the frequency domain information, and the sequence information in the parameter set #3 as the information #1 to the information #3.

Alternatively, in one embodiment of the present invention, for information #a in the time domain information, the frequency domain information, and the sequence information, the following condition exists: information #a included in M parameter sets (corresponding to a same resource multiplexing mode) is different from each other. In this case, the network device may determine information #a used by the reference signal, and the network device may transmit indication information of the information #a to the terminal device. Therefore, the terminal device can uniquely determine, based on the information #a, a parameter set to which the information #a belongs, and use time domain information, frequency domain information, and sequence information in the parameter set as the information #1 to the information #3.

As an example rather than a limitation, in this embodiment of the present invention, a candidate time domain location of the reference signal in the code division multiplexing mode (for example, the CDM mode) may be the same as or different from a candidate time domain resource location of the reference signal in the frequency division multiplexing mode (for example, the IFDMA mode).

In one embodiment of the present invention, a quantity of candidate time domain locations of the reference signal in the code division multiplexing mode (for example, the CDM mode) may be greater than a quantity of candidate time domain locations of the reference signal in the frequency division multiplexing mode (for example, the IFDMA mode).

In one embodiment of the present invention, the candidate time domain locations of the reference signal in the frequency division multiplexing mode (for example, the IFDMA mode) may be a subset of the candidate time domain locations of the reference signal in the code division multiplexing mode (for example, the CDM mode).

As an example rather than a limitation, in this embodiment of the present invention, the candidate time domain locations of the first reference signal in the code division multiplexing mode (for example, the CDM mode) may change as a location of the time unit carrying the first uplink channel changes.

In one embodiment, in the code division multiplexing mode, when a duration of the time unit n carrying the first uplink channel and indicated by scheduling information is three symbols, the candidate time domain locations of the first reference signal may be time domain locations in three time units, for example, time domain locations in the time unit n, the time unit n−1, and the time unit n−2.

In one embodiment, in the code division multiplexing mode, when a duration of the time unit n carrying the first uplink channel and indicated by scheduling information is two symbols, the candidate time domain locations of the first reference signal may be time domain locations in four time units, for example, time domain locations in the time unit n+1, the time unit n, the time unit n−1, and the time unit n−2, or time domain locations in the time unit n, the time unit n−1, the time unit n−2, and a time unit n−3.

As an example rather than a limitation, in this embodiment of the present invention, the first uplink channel (that is, the first uplink channel demodulated based on the first reference signal) may be carried in X (X≥2) continuous time units (that is, an example of the second time unit). Therefore, the following cases may exist:

Case 1: A time unit (that is, the time unit #A) carrying the first reference signal belongs to the X time units.

In this case, in one embodiment of the present invention, assuming that a symbol #A carries the first reference signal, and that a symbol #B is a symbol (for example, the first symbol or the last symbol in the X time units) spaced apart from the symbol #A by a maximum quantity of symbols in the X time units, in this embodiment of the present invention, when determining the symbol #A, the network device may allow the symbol #A to satisfy the following condition:

A quantity of symbols by which the symbol #A is spaced apart from the symbol #B is less than or equal to a threshold #A (that is, an example of a first threshold). As an example rather than a limitation, the threshold #A may be an integer greater than or equal to 2.

Case 2: A time unit (that is, the time unit #A) carrying the first reference signal does not belong to the X time units.

Therefore, the following cases may exist:

Case 2-A: The time unit #A and the X time units are continuous. For example, a symbol #A is adjacent to the first symbol or the last symbol in the X time units.

In this case, assuming that a symbol #C is a symbol (for example, the first symbol or the last symbol in the X time units) spaced apart from the symbol #A by a largest quantity of symbols in the X time units, in this embodiment of the present invention, when determining the symbol #A, the network device may allow the symbol #A to satisfy the following condition:

A quantity of symbols by which the symbol #A is spaced apart from the symbol #C is less than or equal to a threshold #B (that is, an example of a second threshold). As an example rather than a limitation, the threshold #B may be an integer greater than or equal to 2.

In addition, as an example rather than a limitation, in this embodiment of the present invention, the threshold #B may be the same as the threshold #A.

Case 2-B: The time unit #A and the X time units are discontinuous. For example, a symbol #A is spaced apart from a first time unit or a last time unit in the X time units by at least one symbol.

In this case, in one embodiment of the present invention, assuming that a symbol #D is a symbol (for example, the first symbol or the last symbol in the X time units) spaced apart from the time unit #A by a large quantity of symbols in the X time units, in this embodiment of the present invention, when determining the symbol #A, the network device may allow the symbol #A to satisfy the following condition:

A quantity of symbols by which the symbol #A is spaced apart from the symbol #D is less than or equal to a threshold #C (that is, an example of a third threshold). As an example rather than a limitation, the threshold #C may be an integer greater than or equal to 2.

In addition, as an example rather than a limitation, in this embodiment of the present invention, the threshold #C may be less than or equal to the threshold #A, or the threshold #C may be less than or equal to the threshold #B.

It should be noted that, in one embodiment of the present invention, the network device may determine the information #1, the information #2, and the information #3 based on any one of the foregoing manners 1 to 3 by using a method and process similar to those used by the terminal device, further determine the first resource, and receive, on the first resource, the first reference signal transmitted by the terminal device.

It should be understood that, the specific mapping relationship between the information about the first resource (for example, the time domain information of the first resource and/or the frequency domain information of the first resource) and the sequence information of the first reference signal (specifically, the sequence set used for the first reference signal) is merely an example for description. This is not particularly limited in the present invention. When it can be ensured that the network device and the terminal device determine the other one based on one of the information about the first resource and the sequence information of the first reference signal, specific content of the mapping relationship may be changed randomly.

For example, in one embodiment of the present invention, assuming that a quantity of cyclic shifts that can be used when the first reference signal and the first uplink channel are carried in a same time unit (for example, an sTTI) is a quantity #A, and assuming that a quantity of cyclic shifts that can be used when the first reference signal and the first uplink channel are carried in different time units (for example, sTTIs) is a quantity #B, in this embodiment of the present invention, the quantity #A may be greater than or equal to the quantity #B.

In addition, as an example rather than a limitation, in this embodiment of the present invention, the network device may add the information #1, the information #2, the information #3, or the index of the first parameter set to downlink control information (Downlink Control Indicator, DCI), and transmit the DCI to the terminal device.

It should be noted that, in one embodiment of the present invention, the network device may transmit, to the terminal device for a plurality of times, DCI that is used to instruct the terminal device to transmit a reference signal by using the first resource. In addition, the information about the resource used for transmission, the sequence information, or the index of the parameter set carried in the plurality of pieces of DCI may be different.

In this case, the terminal device may transmit a reference signal based on DCI that is received for the first time, and may ignore DCI that is received subsequently. Specifically, in this embodiment of the present invention, the terminal device may determine the information about the first resource and the sequence information of the first sequence set based on information about the resource, sequence information, or an index of a parameter set carried in the DCI that is received for the first time and used to instruct to transmit a reference signal on the first resource.

In one embodiment of the present invention, for transmission of a 2-symbol sPDSCH, sharing the first reference signal (for example, a DMRS) by a plurality of sTTIs can reduce resource overheads of the DMRS. If sharing of a DMRS of a downlink data channel or a control channel is supported, in the present invention, up to two downlink (uplink) sTTIs are allowed to share one DMRS, and one bit is used for indication. Specifically, there may be two indication methods (a time domain location and a frequency domain pattern of the DMRS in an sTTI may be preconfigured).

For example, in one embodiment of the present invention, one bit may be used to indicate whether a DMRS for demodulation of a current sTTI is located in a previous sTTI or a next sTTI.

For another example, in one embodiment of the present invention, one bit may be used to indicate whether a DMRS exists in a current sTTI; and if no DMRS exists in the current sTTI, a DMRS is definitely located in a previous sTTI.

As an example rather than a limitation, in one embodiment of the present invention, a shared DMRS is used only when same UE is continuously scheduled in an sTTI, but is not used for sharing by a plurality of UEs. Therefore, the terminal device needs to buffer content only in a previous sTTI, for determining whether a DMRS exists. Therefore, indication bit overheads are low, and an objective of reducing DMRS overheads can be achieved.

Therefore, in S210, the terminal device can determine the information #1, and determine the time domain location of the first resource based on the information #1. Optionally, the terminal device may determine the information #1 based on second indication information transmitted by the network.

In addition, the terminal device can obtain the information #2, and determine the frequency domain location of the first resource based on the information #2. Optionally, the terminal device may determine the information #2 based on third indication information transmitted by the network.

In addition, the terminal device can obtain the information #3, and determine, based on the information #3, a sequence (that is, the first sequence set) used for the first reference signal. Optionally, the terminal device may determine the information #3 based on first indication information transmitted by the network.

In S220, the terminal device can determine to transmit the first reference signal on the determined first resource based on the determined first sequence set.

It should be noted that, in one embodiment of the present invention, the network device may determine the information #1, the information #2, and the information #3 based on any one of the foregoing manners 1 to 3 by using a method and process similar to those used by the terminal device, further determine the first resource, and receive, on the first resource, the first reference signal transmitted by the terminal device.

It should be understood that, the specific mapping relationship between the information about the first resource (for example, the time domain information of the first resource and/or the frequency domain information of the first resource) and the sequence information of the first reference signal (specifically, the sequence set corresponding to the first reference signal) is merely an example for description. This is not particularly limited in the present invention. When it can be ensured that the network device and the terminal device determine the other one based on one of the information about the first resource and the sequence information of the first reference signal, specific content of the mapping relationship may be changed randomly.

Optionally, in one embodiment of the present invention, assuming that a quantity of cyclic shifts that can be used for the first reference signal when the first reference signal and the first uplink channel are carried in a same time unit (for example, an sTTI) is a quantity #A, and assuming that a quantity of cyclic shifts that can be used for the first reference signal when the first reference signal and the first uplink channel #A are transmitted in different time units (for example, sTTIs) is a quantity #B, in this embodiment of the present invention, the quantity #A may be greater than or equal to the quantity #B.

In addition, as an example rather than a limitation, in this embodiment of the present invention, the network device may add the information #1, the information #2, the information #3, or the index of the first parameter set to downlink control information (Downlink Control Indicator, DCI), and transmit the DCI to the terminal device.

It should be noted that, in one embodiment of the present invention, the network device may transmit, to the terminal device for a plurality of times, DCI that is used to instruct the terminal device to transmit a reference signal by using the first resource. In addition, the information about the resource used for transmission, the sequence information, or the index of the parameter set in the plurality of pieces of DCI may be different.

In this case, the terminal device may transmit a reference signal based on DCI that is received for the first time, and may ignore DCI that is received subsequently, or may transmit a reference signal based on recently received DCI. Specifically, in this embodiment of the present invention, the terminal device may determine the information about the first resource and the sequence information of the first sequence set based on information about the resource used for transmission, sequence information, or an index of a parameter set in the DCI that is received for the first time or received recently and used to instruct to transmit a reference signal on the first resource.

According to the method for transmitting a reference signal in one embodiment of the present invention, because a mapping relationship exists between the information about the first resource (including the time domain resource and/or the frequency domain resource) used for transmitting the first reference signal and the information of the sequence set (including at least one sequence) corresponding to the first reference signal, the first resource can be determined when the information of the sequence set corresponding to the first reference signal is determined. This can reduce signaling overheads for transmitting the first resource and information about the sequence set corresponding to the first reference signal, and can further reduce signaling overheads during uplink transmission, improve utilization efficiency of system resources, and improve system reliability.

Figure 9:
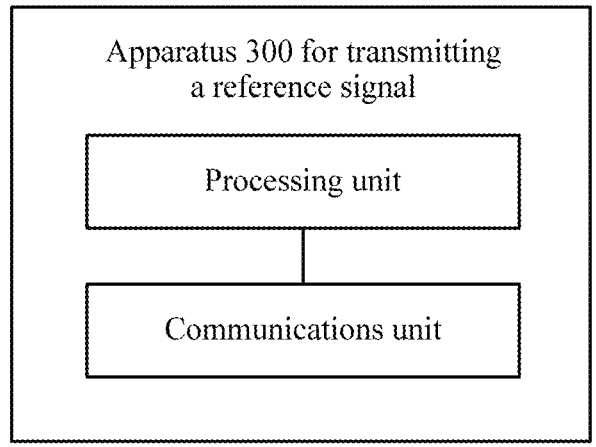
FIG. 9 is a schematic block diagram of an apparatus for transmitting a reference signal according to an embodiment of the present invention.

FIG. 9 is a schematic block diagram of an apparatus 300 for transmitting a reference signal according to an embodiment of the present invention. The apparatus 300 for transmitting a reference signal may correspond to (for example, the apparatus may be configured in or the apparatus itself is) the terminal device (for example, the terminal device) described in the foregoing method 200. In addition, each module or unit in the apparatus 300 for transmitting a reference signal is configured to perform each action or process performed by the terminal device (for example, the terminal device) in the foregoing method 200. Herein, to avoid repetition, a detailed description thereof is omitted.

In one embodiment of the present invention, the apparatus 300 may include a processor and a transceiver, where the processor and the transceiver are communicatively connected. In one embodiment, the device further includes a memory, where the memory and the processor are communicatively connected. Optionally, the processor, the memory, and the transceiver may be communicatively connected. The memory may be configured to store an instruction. The processor is configured to execute the instruction stored in the memory, to control the transceiver to transmit information or a signal.

A communications unit in the apparatus 400 shown in FIG. 9 may correspond to the transceiver, and a processing unit in the apparatus 400 shown in FIG. 9 may correspond to the processor.

Figure 10:
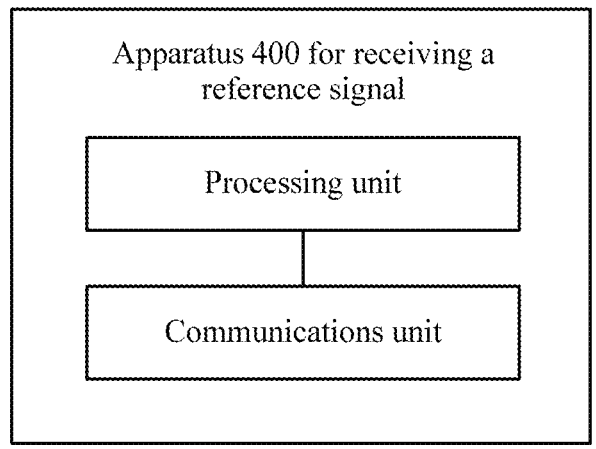
FIG. 10 is a schematic block diagram of an apparatus for receiving a reference signal according to an embodiment of the present invention.

FIG. 10 is a schematic block diagram of an apparatus 400 for receiving a reference signal according to an embodiment of the present invention. The apparatus 400 for receiving a reference signal may correspond to (for example, the apparatus may be configured in or the apparatus itself is) the network device described in the foregoing method 200. In addition, each module or unit in the apparatus 400 for receiving a reference signal is configured to perform each action or process performed by the network device in the foregoing method 200. Herein, to avoid repetition, a detailed description thereof is omitted.

In one embodiment of the present invention, the apparatus 400 may include a processor and a transceiver, where the processor and the transceiver are communicatively connected. In one embodiment, the device further includes a memory, where the memory and the processor are communicatively connected. Optionally, the processor, the memory, and the transceiver may be communicatively connected. The memory may be configured to store an instruction. The processor is configured to execute the instruction stored in the memory, to control the transceiver to transmit information or a signal.

A communications unit in the apparatus 400 shown in FIG. 10 may correspond to the transceiver, and a processing unit in the apparatus 500 shown in FIG. 10 may correspond to the processor.

Figure 11:
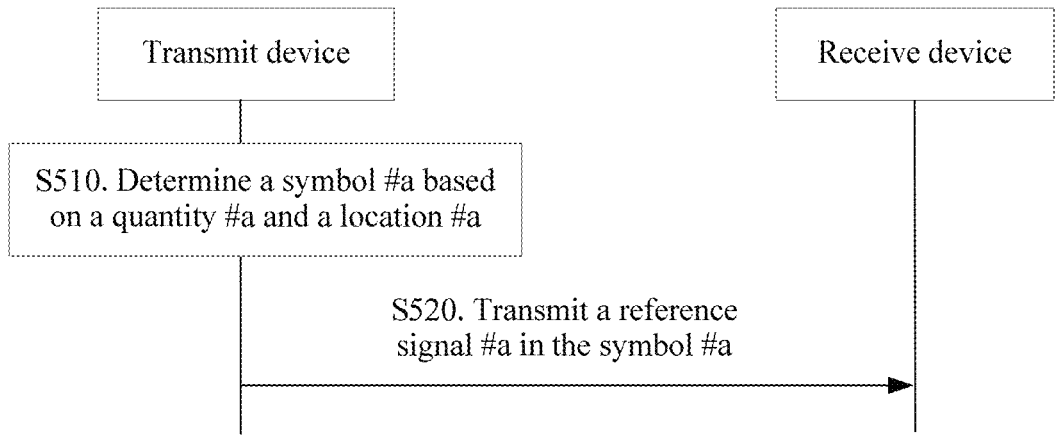
FIG. 11 is a schematic interaction diagram of a process of transmitting a reference signal according to an embodiment of the present invention.

With reference to FIG. 11, the following describes in detail a process of a method 500 for transmitting a reference signal according to another embodiment of the present invention.

The method in this embodiment of the present invention may be applied to uplink transmission. To be specific, a transmit device may be a terminal device, and a receive device may be a network device. Alternatively, the method in this embodiment of the present invention may be applied to downlink transmission. To be specific, in this embodiment of the present invention, a transmit device may be a network device, and a receive device may be a terminal device. This is not particularly limited in this embodiment of the present invention.

As shown in FIG. 11, in S510, the transmit device determines a first time unit (denoted as a time unit #A, where the time unit #A may be, for example, an sTTI) used for transmitting a first reference signal (denoted as a reference signal #a).

It should be noted that, in one embodiment of the present invention, a method and process of determining the time unit #A by the transmit device may be similar to the foregoing process of determining a time unit used for carrying a reference signal in the method 200 shown in FIG. 2. For example, the first time unit may be determined based on a first sequence set used for the first reference signal, or the first time unit and a first sequence set used for the first reference signal may belong to a same parameter set.

Alternatively, in one embodiment of the present invention, a method and process of determining the first time unit by the transmit device may be similar to those in the prior art. This is not particularly limited in the present invention.

Then the transmit device may determine a quantity (denoted as a quantity #a) of symbols included in the first time unit, and the transmit device may determine a location (denoted as a location #a) of the first time unit in a time period to which the first time unit belongs.

As an example rather than a limitation, in one embodiment of the present invention, the time period to which the first time unit belongs may be a subframe, or a duration of the time period to which the first time unit belongs may be 1 ms.

In addition, in one embodiment of the present invention, the time period to which the first time unit belongs may include, for example, 6 time units. For example, the time units in the time period include 322223 or 223223, where 2 represents 2 symbols, and 3 represents 3 symbols.

In addition, the transmit device may determine, based on the quantity #a and the location #a, a symbol (denoted as a symbol #a) used for carrying the first reference signal, and specifically, a location of the symbol #a in the time unit #A.

As an example rather than a limitation, in one embodiment of the present invention, the following method and process may be used to determine the symbol #a.

For example, if the quantity #a is 3 and the location #a is a first time unit in the time period to which the time unit #A belongs, the transmit device may determine that the symbol #a is a second symbol in the time unit #A, or the transmit device may determine that the symbol #a is the last symbol in the time unit #A.

For another example, if the quantity #a is 3 and the location #a is the last time unit in the time period to which the time unit #A belongs, the transmit device may determine that the symbol #a is the first symbol in the time unit #A, or the transmit device may determine that the symbol #a is a second symbol in the time unit #A.

For another example, if the quantity #a is 3 and the location #a is a third time unit in the time period to which the time unit #A belongs, the transmit device may determine that the symbol #a is the first symbol in the time unit #A, or the transmit device may determine that the symbol #a is a second symbol in the time unit #A.

Therefore, in S510, the transmit device can determine the time unit #A used for carrying the reference signal #a, and the symbol #a used for carrying the reference signal #a in the time unit #A.

In addition, in one embodiment of the present invention, the transmit device may further determine the sequence set used by the reference signal #a. In addition, the process and method may be similar to the foregoing method and process of determining a sequence set used by a reference sequence in the method 200. For example, the sequence set used by the reference signal #a may be determined based on the time unit #A, or the time unit #A and the sequence set used by the reference signal #a may belong to a same parameter set.

Alternatively, in one embodiment of the present invention, a method and process of determining the time unit #A by the transmit device may be similar to those in the prior art. This is not particularly limited in the present invention.

In addition, the transmit device may determine a frequency domain resource used by the reference signal #a, for example, a frequency domain pattern used by the reference signal #a.

It should be noted that, in one embodiment of the present invention, a method and process of determining the frequency domain resource (for example, the frequency domain pattern) used by the reference signal #a by the transmit device may be similar to the foregoing process of determining a frequency domain resource (for example, a frequency domain pattern) used for carrying a reference signal in the method 200 in FIG. 2. For example, the frequency domain resource (for example, the frequency domain pattern) used by the reference signal #a may be determined based on the sequence set used by the reference signal #a, or the frequency domain resource (for example, the frequency domain pattern) used by the reference signal #a and the sequence set used by the reference signal #a may belong to a same parameter set.

Alternatively, in one embodiment of the present invention, a method and process of determining the frequency domain resource (for example, the frequency domain pattern) used by the reference signal #a by the transmit device may be similar to those in the prior art. This is not particularly limited in the present invention.

In S520, the receive device may determine the symbol #a based on the quantity #a and the location #a, and specifically, the location of the symbol #a in the time unit #A. The process and method may be similar to the foregoing process and method performed by the transmit device in S510. Herein, to avoid repetition, a detailed description thereof is omitted.

Therefore, in S530, the transmit device may transmit the reference signal #a in the symbol #a to the receive device, and the receive device may receive, in the symbol #a, the reference signal #a transmitted by the transmit device.

Because a radio frequency of the terminal device may perform power ramp at a start of a subframe, an end of a subframe, or an end of a slot, transmission performance of the last symbol and the first symbol in the subframe is affected. According to the method for transmitting a reference signal and a method for receiving a reference signal in the present invention, a symbol used for carrying a reference signal is determined based on a quantity of symbols included in a time unit carrying the reference signal and a location of the time unit carrying the reference signal in a subframe. This can prevent an uplink reference signal from being transmitted at a start and an end of a subframe, thereby ensuring performance of the uplink reference signal.

Figure 12:
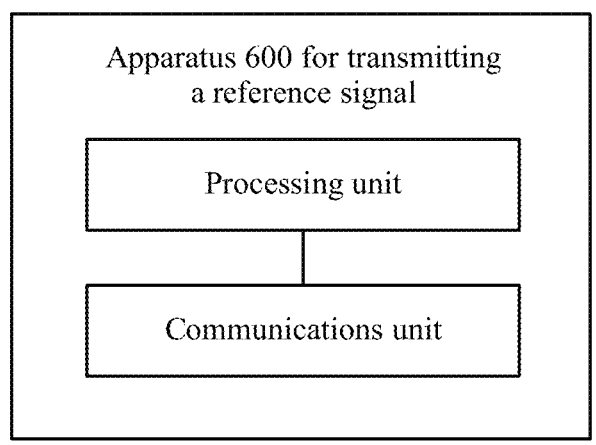
FIG. 12 is a schematic block diagram of an apparatus for transmitting a reference signal according to an embodiment of the present invention.

FIG. 12 is a schematic block diagram of an apparatus 600 for transmitting a reference signal according to an embodiment of the present invention. The apparatus 600 for transmitting data may correspond to (for example, the apparatus may be configured in or the apparatus itself is) the transmit device described in the foregoing method 500. In addition, each module or unit in the apparatus 600 for transmitting a reference signal is configured to perform each action or process performed by the transmit device in the foregoing method 500. Herein, to avoid repetition, a detailed description thereof is omitted.

In one embodiment of the present invention, the apparatus 600 may include a processor and a transceiver, where the processor and the transceiver are communicatively connected. Optionally, the device further includes a memory, where the memory and the processor are communicatively connected. Optionally, the processor, the memory, and the transceiver may be communicatively connected. The memory may be configured to store an instruction. The processor is configured to execute the instruction stored in the memory, to control the transceiver to transmit information or a signal.

A communications unit in the apparatus 600 shown in FIG. 12 may correspond to the transceiver, and a processing unit in the apparatus 600 shown in FIG. 12 may correspond to the processor.

Figure 13:
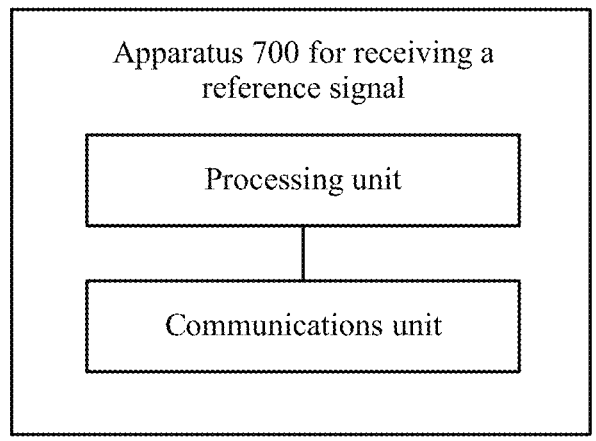
FIG. 13 is a schematic block diagram of an apparatus for receiving a reference signal according to an embodiment of the present invention.

FIG. 13 is a schematic block diagram of an apparatus 700 for receiving a reference signal according to an embodiment of the present invention. The apparatus 700 for receiving a reference signal may correspond to (for example, the apparatus may be configured in or the apparatus itself is) the receive device described in the foregoing method 500. In addition, each module or unit in the apparatus 700 for receiving a reference signal is configured to perform each action or process performed by the receive device in the foregoing method 500. Herein, to avoid repetition, a detailed description thereof is omitted.

In one embodiment of the present invention, the apparatus 700 may include a processor and a transceiver, where the processor and the transceiver are communicatively connected. Optionally, the device further includes a memory, where the memory and the processor are communicatively connected. Optionally, the processor, the memory, and the transceiver may be communicatively connected. The memory may be configured to store an instruction. The processor is configured to execute the instruction stored in the memory, to control the transceiver to transmit information or a signal.

A communications unit in the apparatus 700 shown in FIG. 13 may correspond to the transceiver, and a processing unit in the apparatus 700 shown in FIG. 13 may correspond to the processor.

It should be noted that the foregoing method embodiments may be applied to a processor or may be implemented by a processor. The processor may be an integrated circuit chip and has a signal processing capability. In an implementation process, the steps in the foregoing method embodiments may be implemented by using a hardware integrated logic circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. All the methods, steps, and logical block diagrams disclosed in the embodiments of the present invention can be implemented or performed by the processor. The general purpose processor may be a microprocessor or the processor may be any conventional processor, or the like. The steps of the methods disclosed in the embodiments of the present invention may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory or electrically erasable programmable memory, or a register. The storage medium is located in the memory, and the processor reads information in the memory and completes the steps in the foregoing methods in combination with hardware of the processor.

It can be understood that, the memory in the embodiments of the present invention may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. For example but not for limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and method described in this specification intends to include but is not limited to these memories and any other appropriate types of memories.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that the sequence numbers of the foregoing processes do not mean execution sequences of the embodiments of the present invention, and should not be construed as any limitation on the implementation processes of the embodiments of the present invention. The execution sequences of the processes should be determined based on functions and internal logic of the processes.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use a different method to implement the described functions for each particular application, but it should not be considered that the implementation goes beyond the scope of the embodiments of the present invention.

It may be clearly understood by a person skilled in the art that, for the purpose of convenient and brief description, for a detailed working process of the system, apparatus, and unit, reference may be made to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, the functional units in each embodiment of the present invention may be integrated in one processing unit, or each of the units may exist alone physically, or two or more of the units may be integrated in one unit.

When the functions are implemented in a form of a software functional unit and sold or used as an independent product, the functions may be stored in a computer-readable storage medium. Based on such an understanding, the technical solutions in the embodiments of the present invention, or the part contributing to the prior art, or some of the technical solutions may be implemented in the form of a software product. The computer software product is stored in a storage medium, and includes several instructions for instructing a computer device (which may be a personal computer, a server, a network device, or the like) to perform all or some of steps of the method described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the embodiments of the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention.

What is claimed is:

1. A method for transmitting a reference signal, comprising: determining, by a terminal device, sequence information of a first sequence set corresponding to a first reference signal and information about a first resource used for transmitting the first reference signal, wherein the first sequence set comprises at least one sequence, and wherein a first mapping relationship exists between the sequence information of the first sequence set and the information about the first resource including time domain information and frequency domain information of the first resource, wherein a first quantity is a quantity of sequences comprised in the first sequence set when the first resource and a second resource belong to a same time unit in time domain, wherein a second quantity is a quantity of sequences comprised in the first sequence set when the first resource and the second resource belong to different time units in time domain, wherein the first quantity is greater than the second quantity, wherein the second resource is used for transmitting a first uplink channel, and wherein the first reference signal corresponds to the first uplink channel; and transmitting, by the terminal device, the first reference signal based on the sequence information of the first sequence set and the information about the first resource.

2. The method according to claim 1, wherein determining sequence information of the first sequence set corresponding to the first reference signal and information about the first resource used for transmitting the first reference signal comprises:

receiving, by the terminal device, first indication information, wherein the first indication information is used to indicate the sequence information of the first sequence set; and determining, by the terminal device, the information about the first resource based on the sequence information of the first sequence set and the first mapping relationship.

3. The method according to claim 1, wherein the information about the first resource comprises the time domain information, and the first mapping relationship comprises the mapping relationship between the sequence information of the first sequence set and the time domain information of the first resource; and wherein determining sequence information of the first sequence set corresponding to the first reference signal and information about the first resource used for transmitting the first reference signal comprises:

receiving, by the terminal device, second indication information, wherein the second indication information is used to indicate the time domain information of the first resource; and determining, by the terminal device, the sequence information of the first sequence set based on the time domain information of the first resource and the first mapping relationship.

4. The method according to claim 1, wherein determining sequence information of the first sequence set corresponding to the first reference signal and information about the first resource used for transmitting the first reference signal comprises:

receiving, by the terminal device, third indication information, wherein the third indication information is used to indicate an identifier of a first parameter set in N parameter sets, N≥2, N is a positive integer, each of the N parameter sets comprises at least one piece of sequence information, each parameter set comprises at least one piece of time domain information or at least one piece of frequency domain information, and at least one of time domain information, frequency domain information, or sequence information in any two parameter sets is different; and using, by the terminal device, information comprised in the first parameter set as the information about the first resource and the sequence information of the first sequence set.

5. The method according to claim 1, wherein the frequency domain information comprises first frequency domain information, and the first frequency domain information is a frequency domain pattern of a frequency division multiplexing mode.

6. The method according to claim 5, wherein the first frequency domain information is used to indicate at least a first frequency domain pattern and a second frequency domain pattern different from the first frequency domain pattern, the sequence information of the first sequence set comprises at least a first sequence and a second sequence different from the first sequence; and the first sequence corresponds to the first frequency domain pattern, and the second sequence corresponds to the second frequency domain pattern.

7. The method according to claim 1, wherein the frequency domain information comprises first frequency domain information and second frequency domain information, the first frequency domain information is used to indicate a frequency domain pattern corresponding to a frequency division multiplexing mode, and the second frequency domain information is used to indicate a frequency domain pattern corresponding to a code division multiplexing mode; and before determining sequence information of the first sequence set corresponding to the first reference signal and information about the first resource used for transmitting the first reference signal, the method further comprises:

receiving, by the terminal device, fourth indication information, wherein the fourth indication information is used to indicate whether the frequency domain information of the first resource is the first frequency domain information or the second frequency domain information.

8. The method according to claim 1, wherein the time domain information is used to indicate a time unit offset between a time unit used for transmitting the first reference signal and a time unit used for transmitting the first uplink channel, and the reference signal corresponding to the first uplink channel is the first reference signal; or the time domain information is used to indicate an index value of a time unit used for transmitting the first reference signal.

9. The method according to claim 1, wherein determining sequence information of the first sequence set corresponding to the first reference signal and information about the first resource used for transmitting the first reference signal comprises:

receiving, by the terminal device, K pieces of control information, wherein each of the K pieces of control information is used to instruct the terminal device to transmit a reference signal in a third time unit, K≥2, and the third time unit is a time unit indicated by each of the K pieces of control information and used for carrying the first reference signal; and determining, by the terminal device, the information about the first resource and the sequence information of the first sequence set based on first control information in the K pieces of control information, wherein the first control information is a first piece of control information, received by the terminal device, in the K pieces of control information.

10. An apparatus for transmitting a reference signal, comprising:

a processing unit configured to determine sequence information of a first sequence set corresponding to a first reference signal and information about a first resource used for transmitting the first reference signal, wherein the first sequence set comprises at least one sequence, and wherein a first mapping relationship exists between the sequence information of the first sequence set and the information about the first resource including time domain information and frequency domain information of the first resource, wherein a first quantity is a quantity of sequences comprised in the first sequence set when the first resource and a second resource belong to a same time unit in time domain, wherein a second quantity is a quantity of sequences comprised in the first sequence set when the first resource and the second resource belong to different time units in time domain, wherein the first quantity is greater than the second quantity, wherein the second resource is used for transmitting a first uplink channel, and wherein the first reference signal corresponds to the first uplink channel; and a communications unit configured to transmit the first reference signal based on the sequence information of the first sequence set and the information about the first resource.

11. The apparatus according to claim 10, wherein the communications unit is further configured to receive first indication information, wherein the first indication information is used to indicate the sequence information of the first sequence set; and the processing unit is configured to determine the information about the first resource based on the sequence information of the first sequence set and the first mapping relationship.

12. The apparatus according to claim 10, wherein the information about the first resource comprises the time domain information, and the first mapping relationship comprises the mapping relationship between the sequence information of the first sequence set and the time domain information of the first resource;

the communications unit is further configured to receive second indication information, wherein the second indication information is used to indicate the time domain information of the first resource; and the processing unit is configured to determine the sequence information of the first sequence set based on the time domain information of the first resource and the first mapping relationship.

13. The apparatus according to claim 10, wherein the communications unit is further configured to receive third indication information, wherein the third indication information is used to indicate an identifier of a first parameter set in N parameter sets, N≥2, N is a positive integer, each of the N parameter sets comprises at least one piece of sequence information, each parameter set comprises at least one piece of time domain information and/or at least one piece of frequency domain information, and at least one of time domain information, frequency domain information, and sequence information in any two parameter sets is different; and the processing unit is configured to use information comprised in the first parameter set as the information about the first resource and the sequence information of the first sequence set.

14. The apparatus according to claim 10, wherein the frequency domain information comprises first frequency domain information, and the first frequency domain information is a frequency domain pattern of a frequency division multiplexing mode.

15. The apparatus according to claim 14, wherein the first frequency domain information is used to indicate at least a first frequency domain pattern and a second frequency domain pattern different from the first frequency domain pattern, the sequence information of the first sequence set comprises at least a first sequence and a second sequence different from the first sequence; and the first sequence corresponds to the first frequency domain pattern, and the second sequence corresponds to the second frequency domain pattern.

16. The apparatus according to claim 10, wherein the frequency domain information comprises the first frequency domain information and second frequency domain information, the first frequency domain information is used to indicate a frequency domain pattern corresponding to a frequency division multiplexing mode, and the second frequency domain information is used to indicate a frequency domain pattern corresponding to a code division multiplexing mode; and the communications unit is further configured to receive fourth indication information, wherein the fourth indication information is used to indicate whether the frequency domain information of the first resource is the first frequency domain information or the second frequency domain information.

17. The apparatus according to claim 10, wherein the time domain information is used to indicate a time unit offset between a time unit used for transmitting the first reference signal and a time unit used for transmitting the first uplink channel, and the reference signal corresponding to the first uplink channel is the first reference signal; or the time domain information is used to indicate an index value of a time unit used for transmitting the first reference signal.

18. The apparatus according to claim 10, wherein the communications unit is further configured to receive K pieces of control information, wherein each of the K pieces of control information is used to instruct the apparatus to transmit a reference signal in a third time unit, K≥2, and the third time unit is a time unit indicated by each of the K pieces of control information and used for carrying the first reference signal; and the processing unit is configured to determine the information about the first resource and the sequence information of the first sequence set based on first control information in the K pieces of control information, wherein the first control information is a first piece of control information, received by the apparatus, in the K pieces of control information.

* * * * *